US009933981B2

(12) United States Patent
Van Vliembergen et al.

(10) Patent No.: US 9,933,981 B2
(45) Date of Patent: Apr. 3, 2018

(54) METHOD FOR SCHEDULING PRINTING OF DIGITAL IMAGES FROM AT LEAST ONE INPUT ROLL TO AT LEAST ONE OUTPUT ROLL IN A ROLL-TO-ROLL PRINTING SYSTEM

(71) Applicant: Océ Holding B.V., Venlo (NL)

(72) Inventors: Eduardus J. W. Van Vliembergen, Venlo (NL); Elsemieke P. A. Van Rossum, Venlo (NL); Frederik De Jong, Venlo (NL); Cyrillus J. M. F. C. Raemaekers, Venlo (NL)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 15/337,458

(22) Filed: Oct. 28, 2016

(65) Prior Publication Data

US 2017/0262242 A1     Sep. 14, 2017

(30) Foreign Application Priority Data

Mar. 10, 2016 (EP) .................................. 16159550

(51) Int. Cl.
*G06F 3/12* (2006.01)

(52) U.S. Cl.
CPC .......... *G06F 3/1263* (2013.01); *G06F 3/1205* (2013.01); *G06F 3/1217* (2013.01); *G06F 3/1251* (2013.01); *G06F 3/1256* (2013.01); *G06F 3/1285* (2013.01)

(58) Field of Classification Search
None
See application file for complete search history.

(56) References Cited

U.S. PATENT DOCUMENTS

| 6,827,012 | B1* | 12/2004 | Palmatier | B65H 39/075 101/225 |
| 7,729,004 | B2* | 6/2010 | Currans | B41F 33/00 101/483 |
| 2010/0316426 | A1* | 12/2010 | Takahashi | G06F 3/1212 400/76 |

(Continued)

FOREIGN PATENT DOCUMENTS

| EP | 2431861 A2 | 3/2012 |
| EP | 2857955 A1 | 4/2015 |
| WO | WO 2015/039991 A1 | 3/2015 |

*Primary Examiner* — Thomas D Lee
(74) *Attorney, Agent, or Firm* — Birch, Stewart, Kolasch & Birch, LLP

(57) ABSTRACT

A method for printing digital images on at least one input roll of media in order to form at least one output roll by means of a roll-to-roll printing system is disclosed. The roll-to-roll printing system includes a digital image queue including an entry for each digital image to be printed. The method includes registering in an entry of the digital image queue a first digital item identifying the digital image and digital items of print properties of the digital image, printing the digital image according to the order of the entry in the digital image queue, and registering in the entry a second digital item identifying an input roll on which the digital image is going to be printed and a third digital item identifying an output roll on which the printed digital image is going to be wound. A roll-to-roll printing system is configured to apply the method.

14 Claims, 20 Drawing Sheets

(56) References Cited

U.S. PATENT DOCUMENTS

2015/0153985 A1* 6/2015 Fujinaga ............... G06F 3/1263
358/1.15
2015/0343810 A1* 12/2015 Verhofstad ................ B41J 3/60
347/104

* cited by examiner

| Input roll | Digital Image | No of Copies | Output roll |
|---|---|---|---|
| 1 | Image 311 | 100 | 1 |
| 1 | Image 312 | 100 | 1 |
| 2 | Image 321 | 100 | 1 |
| 2 | Image 322 | 100 | 1 |
| 2 | Image 323 | 100 | 1 |

Fig. 7

| Input roll | Digital Image | No of Copies | Output roll |
|---|---|---|---|
| 1 | Image 311 | 100 | 1 |
| 1 | Image 312 | 100 | 1 |
| 1 | Image 321 | 100 | 2 |
| 1 | Image 322 | 100 | 2 |
| 1 | Image 323 | 100 | 2 |

Fig. 8

| Input roll | Digital Image | No of copies | Output roll |
|---|---|---|---|
| 1 | Image 311 | 100 | 1 |
| 1 | Image 312 | 100 | 1 |
| 2 | Image 321 | 100 | 1 |
| 2 | Image 322 | 80 | 1 |
| 2 | Image 323 | 60 | 2 |

Fig. 9

| Input holder 101 | Input roll 102 | Digital Image 103 | No of copies 104 | Output roll 105 | Output holder 106 |
|---|---|---|---|---|---|
| 1 | 1 | Image 311 | 100 | 1 | 1 |
| 1 | 1 | Image 312 | 100 | 1 | 1 |
| 2 | 2 | Image 321 | 100 | 1 | 1 |
| 2 | 2 | Image 322 | 80 | 1 | 1 |
| 2 | 2 | Image 323 | 60 | 1 | 1 |
| 1 | 3 | Image 331 | 200 | 2 | 2 |
| 1 | 3 | Image 332 | 300 | 2 | 2 |
| 2 | 4 | Image 411 | 500 | 3 | 1 |
| 2 | 5 | Image 511 | 250 | 4 | 2 |
| 2 | 5 | Image 512 | 250 | 5 | 1 |
| 1 | 6 | Image 611 | 300 | 5 | 2 | ately due
METHOD FOR SCHEDULING PRINTING OF DIGITAL IMAGES FROM AT LEAST ONE INPUT ROLL TO AT LEAST ONE OUTPUT ROLL IN A ROLL-TO-ROLL PRINTING SYSTEM

CROSS-REFERENCE TO RELATED APPLICATIONS

This application claims priority under 35 U.S.C. § 119(a) to Application No. 16159550.9, filed in Europe on Mar. 10, 2016, the entire contents of which is hereby incorporated by reference into the present application.

BACKGROUND OF THE INVENTION

1. Field of the Invention

The present invention relates to a method for printing digital images on at least one input roll of media in order to form at least one output roll by means of a roll-to-roll system, the roll-to-roll system comprising a digital image queue comprising an entry for each digital image to be printed, the method comprising the steps of registering in an entry of the digital image queue a first digital item identifying the digital image and digital items of print properties of the digital image, and printing the digital image according to the order of the entry in the digital image queue.

2. Description of Background Art

Nowadays, printing systems are available for printing digital images according to a digital image queue. The digital image queue has an entry for each submitted digital image to be printed. The sequence order of the entries in the digital image queue represents a chronological order of printing the corresponding digital images on the at least one input roll. Such an entry comprises a digital identification of the digital image, for example a link to the storage location of the digital image or a print job number, image properties of the digital image, etc. A user is able to move entries up and down the digital image queue, for example to move an entry to the head of the digital image queue.

Roll-to-roll systems have an input section comprising at least one input holder for holding input rolls and an output section comprising at least one output holder for holding output rolls. An input roll may be split resulting in different output rolls, for by example by executing a cut of the input roll during printing. An output roll may have media wound up from different input rolls. The output roll may be formed by concatenating the input rolls to each other. For example, an end side of a first input roll may be adhered or glued to the beginning side of a second input roll, etc. In another application, the unwinding of media of the second input roll is started automatically when the first input roll is fully unwound and leads to the media from the second roll wound up on the same output roll as where media of the first input roll is wound up without any adhesive material. Each of the input rolls has its own core and is provided in the input roll section of the printing device. The input roll section may be provided with more than one input holder for holding input rolls. The formed output roll has one core and is provided in an output roll section of the printing device. The output roll section has at least one output holder for holding output rolls.

Especially, in a roll-to-roll printing system moving an entry to the head of a digital image queue may result in a plurality of operator actions when the media specified for the digital image corresponding to the entry that is moved to the head of the digital image is another media than a media of the current first input roll. Subsequent operator actions may be cutting a current first input roll, unloading the current first input roll, loading a second input roll, printing the digital image on the second input roll, cutting the second input roll, unloading the second input roll, loading the first input roll again and continuing printing of the originally planned digital images on the first input roll.

Users may want to influence an order of printing the digital images, but productivity may drop dramatically due to additional roll changes as described in the example here-above.

SUMMARY OF THE INVENTION

An objective of the present invention is to influence an order of printing digital images on at least one input roll resulting in at least one printed output roll, to increase the productivity while the digital images are still printed in an acceptable amount of time.

The objective is achieved by the method according to the present invention comprising the step of registering in the entry a second digital item identifying an input roll on which the digital image is going to be printed and a third digital item identifying an output roll on which the printed digital image is going to be wound.

By doing so, an input roll and an output roll are identified for each digital image to be printed. It becomes possible to offer functionality via a user interface of the roll-to-roll system for moving and manipulating the entry of the digital image queue.

According to an embodiment, the method comprises the step of displaying the entry of the digital image queue by means of user operable digital representations of the digital items of the entry on a user interface of the roll-to-roll printing system. When displaying the entries of the digital image queue, the user gets an overview of the order in which the digital images are going to be printed. By displaying the user operable digital representations of the digital items of the entry corresponding to a digital image, especially the second digital item and third digital item, the user knows on which input roll the digital image is going to be printed and at which output roll the printed digital image will be wound up. This is especially advantageous if digital images printed on more than one input roll are wound up on the same output roll, digital images printed on one input roll are wound up on more than one output roll, or digital images printed on more than one input roll, are wound up on more than one output roll. In the latter cases, the roll-to-roll printing system may comprise a cutting device for cutting the media. The cutting device may be positioned between a print unit and the at least one output holder.

The user interface of the roll-to-roll printing system for input of operator actions or displaying the status of the roll-to-roll printing system may be a local user interface connected to the roll-to-roll printing system or a remote user interface wirelessly connected to the roll-to-roll printing system, like a mobile device, a tablet, a mobile phone, a smart phone, a smart watch, smart glasses, a notebook computer, a laptop computer or any other hand held device. The user interface may also be a part of a desktop computer connected to the roll-to-roll printing system via a network system.

According to an embodiment, the method comprises the step of moving the entry of the digital image queue to a first other location in the digital image queue within a group of entries having the same second digital item by moving the corresponding user operable digital representations. Since the second digital item identifies the appropriate input roll, digital images are easily repositionable on said input roll without leading to additional roll changes.

According to an embodiment, the first other location is a last entry in the group of entries having the same second digital item. Such a move of an entry to a last entry corresponding to a digital image which is last printed on an input roll may be advantageous to have fast access to the printed digital image corresponding to the moved entry because the last printed digital image on the input roll is first available in post-processing the printed output roll in case of one output roll.

According to an embodiment, the method comprises the step of moving the entry of the digital image queue to a first other location in the digital image queue within a group of entries having another second digital item by moving the corresponding user operable digital representations. Since the other second digital item identifies another input roll, the digital image is easily repositionable to the other input roll, for example in case the original input roll identified by the second digital item of the entry has become completely planned.

According to an embodiment, the method comprises the step of moving the entry of the digital image queue to a second other location in the digital image queue within a group of entries having the same third digital item by moving the corresponding user operable digital representations. Since the third digital item identifies the appropriate output roll, digital images are easily repositionable on said output roll without leading to additional roll changes in case of at least one input roll of the same media and without leading to output roll core changes in an output section of the roll-to-roll printing system.

According to an embodiment, the second other location is a last entry in the group of entries having the same third digital item. Such a move of an entry to a last entry corresponding to a digital image which is last printed on an output roll may be advantageous to have fast access to the printed digital image corresponding to the moved entry because the last printed digital image on the output roll is first available in post-processing the printed output roll.

According to an embodiment, the method comprises the step of moving the entry of the digital image queue to a first other location in the digital image queue within a group of entries having another third digital item by moving the corresponding user operable digital representations. Since the other third digital item identifies another output roll, the digital image is easily repositionable to the other output roll, for example in case the original output roll identified by the third digital item of the entry has become completely planned.

According to an embodiment, the method comprises the step of moving a group of entries having a same second digital item by moving in one move action a group of corresponding user operable digital representations on the user interface. Since the group of entries having the same second digital item represent digital images to be printed on one particular input roll, such a move action may enable the changing of the order of printing on a plurality of input rolls.

For example, a first input roll is firstly scheduled to be printed upon and a second input is secondly scheduled to be printed upon. The secondly scheduled input roll may become firstly scheduled if user operable digital items on the user interface corresponding to the group of entries corresponding to the secondly scheduled input roll are moved to a location on the user interface representing a position in the digital image queue before the entries corresponding to the firstly scheduled input roll.

A move of a specific input roll with planned digital images before another input roll is easy, since a plurality of planned digital images on the specific input roll does not have to be moved one by one in the digital image queue to the other input roll.

According to an embodiment, the method comprises the step of moving a group of entries having a same third digital item by moving in one move action a group of corresponding user operable digital representations on the user interface. Since the group of entries having the same third digital item represent digital images to be wound up on one particular output roll, such a move action may enable the changing of the order of printing on a plurality of output rolls registered in the digital image queue.

According to an embodiment, the method comprises the steps of displaying a user operable digital pool item on the user interface, the user operable digital pool item comprising a plurality of representations of digital images to be printed, dragging a digital image from the user operable digital pool item to a position among the user operable digital representations of the digital image queue, and creating a new entry for the digital image at a location in the digital image queue, which location corresponds to said position.

According to an embodiment, the digital images are represented by thumbnail images on the user interface.

According to an embodiment, the method comprises the steps of displaying the user operable digital item representing an input roll scheduled in the digital image queue on the user interface together with a user operable property representation of a property of the scheduled input roll, changing the property representation to a new value of the property, and automatically changing the same property in entries of the digital image queue with the second digital item having a value corresponding to the scheduled input roll. A property of the input roll, like a media width, a margin to the edge of the input roll or a media type, may be changed and another roll according to the change may be loaded in an input holder. All digital images which are already scheduled in the digital image queue for the scheduled input roll are now to be printed on the scheduled input roll with the changed property or properties. The operator no longer needs to change a property of each individual digital image to be printed on the scheduled input rolled.

According to an embodiment, the method comprises the step of registering in the entry a fourth digital item identifying an input holder for an input roll identified in the second digital item and a fifth digital item identifying an output holder for an output roll identified in the third digital item. If the roll-to-roll system has a plurality of input holders and/or a plurality of output holders, (re)loading and unloading of input rolls and/or output rolls, is elucidated in the digital image queue and visible on the user interface.

Roll changes—input roll changes as well as output roll changes—are coupled to the appropriate roll holders.

The present invention also relates to a roll-to-roll printing system for printing digital images comprising at least one input holder for holding at least one input roll of media, a print engine to print digital images on media unwound from the at least one input roll in order to form at least one output roll of the printed media, at least one output holder for holding at least one output roll of the printed media, a controller comprising a digital image queue comprising an entry for each digital image to be printed, the entry comprising a first digital item identifying the digital image and digital items of print properties of the digital image, and a user interface for displaying and manipulating an entry of the digital image queue, wherein the entry comprises a second digital item identifying an input roll on which the digital image is going to be printed and a third digital item identifying an output roll on which the printed digital image is going to be wound.

According to an embodiment of the roll-to-roll printing system, the entry comprises a fourth digital item identifying an input holder for an input roll identified in the second digital item and a fifth digital item identifying an output holder for an output roll identified in the third digital item.

According to an embodiment of the roll-to-roll system, the controller is configured to execute any one of the methods according to the present invention.

The present invention also relates to a non-transitory recording medium comprising computer executable program code configured to instruct a computer to perform any one of the methods according to the present invention.

It may be clear for the skilled person that the previous embodiments of the methods may be combined in one way or another resulting in embodiments which also fall under the scope of the present invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 6-10 illustrate internal storage representations of a digital image queue according to the present invention;

DETAILED DESCRIPTION OF THE PREFERRED EMBODIMENTS

Figure 1:
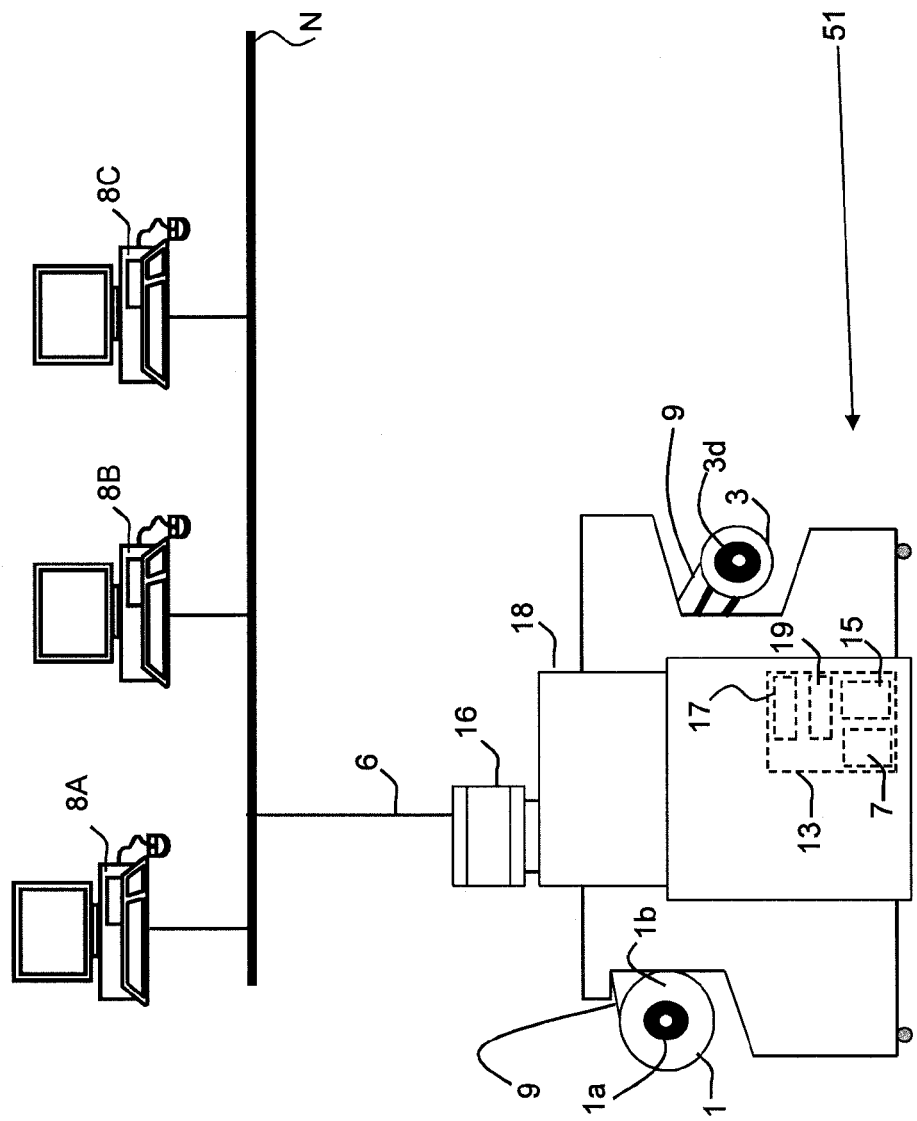
FIGS. 1-5 schematically illustrate roll-to-roll printing systems in which the invented method is applicable.

The present invention will now be described with reference to the accompanying drawings, wherein the same reference numerals have been used to identify the same or similar elements throughout the several views.

FIG. 1 illustrates a roll-to-roll printing system 51 connected to a network N. The roll-to-roll printing system 51 is available for a user working with one of workstations 8A-8C and intending to send a digital image from one of the workstations 8A-8C to a controller 13 inside of the roll-to-roll printing system 51. The roll-to-roll printing system 51 is connected to the network N via a wired or wireless connector 6 and is suited for receiving digital images from the workstations 8A-8C. The network N may be wireless. The roll-to-roll printing system 51 comprises one input holder for one input roll 1 and one output holder for one output roll 3. The roll-to-roll printing system 51 comprises a user interface 16 suitable for displaying the digital image queue according to the invention by means of digital images to be printed, a digital representation of the input roll 1 and a digital representation of the output roll 3.

The workstations 8A-8C may be replaced by mobile devices like tablets, notebooks, laptops, etc.

The controller 13 comprises a construction module 17 for constructing a composed digital image representing the digital image queue according to the invention and configured to be shown on the user interface 16. The controller 17 comprises a scheduler 19 for scheduling the digital images submitted to the roll-to-roll printing system 51 in the digital image queue according to the invention. The digital image queue is stored in a digital storage 7 in the controller 13. The controller 13 comprises a control device 15 configured to control the printing process and data transfer between the controller 13 and the user interface 16.

In another embodiment, the controller 13 of the roll-to-roll printing system 51 is integrated in one of the workstations 8A-8C. In this embodiment, the composed digital image is constructed at the one of the workstations 8A-8C, which is wired or wirelessly connected to roll-to-roll printing system 51. In another embodiment, a user interface is provided as a network web site or intranet site that is accessible with a browser on a client computer.

The controller 13 is suited to store a set of digital images, to check whether or not the digital images can be printed and to submit a digital image to a print unit 18 of the roll-to-roll printing system 51 in order to be printed on the input roll 1. Image data of a digital image are stored in digital storage 7 contained in the controller 13 at least for the time period that the digital image is printed by the print unit 18. Image data may be composed and also stored in a memory of at least one of the workstations 8A-8C.

The roll-to-roll printing system 51 processes at least part of the media of the input roll 1. The wound media has a length which is defined as a largest dimension of the media when unrolled. Media material may be paper, textile, transparent sheet material, plastic or any other kind of material or substrate suitable for winding up on the input roll. The input roll 1 is placed in an input holder shown as a white circle in the center of the input roll 1 in FIG. 1. A side view of the input roll 1 comprises a part 1a of the core of the input roll 1 and a side part 1b of the media of the input roll 1.

Individual digital images will be printed on media 9 taken out from the input roll 1. The individual digital images are printed by the print unit 18 of the roll-to-roll printing system 51 according to the digital image queue. The media 9 of the input roll 1 is guided along the print unit 18. The printed media 9 is guided to and wound up on the core 3d of the output roll 3 on an output holder. The output holder is shown as a white circle in the center of the output roll 3 in FIG. 1.

Figure 2:
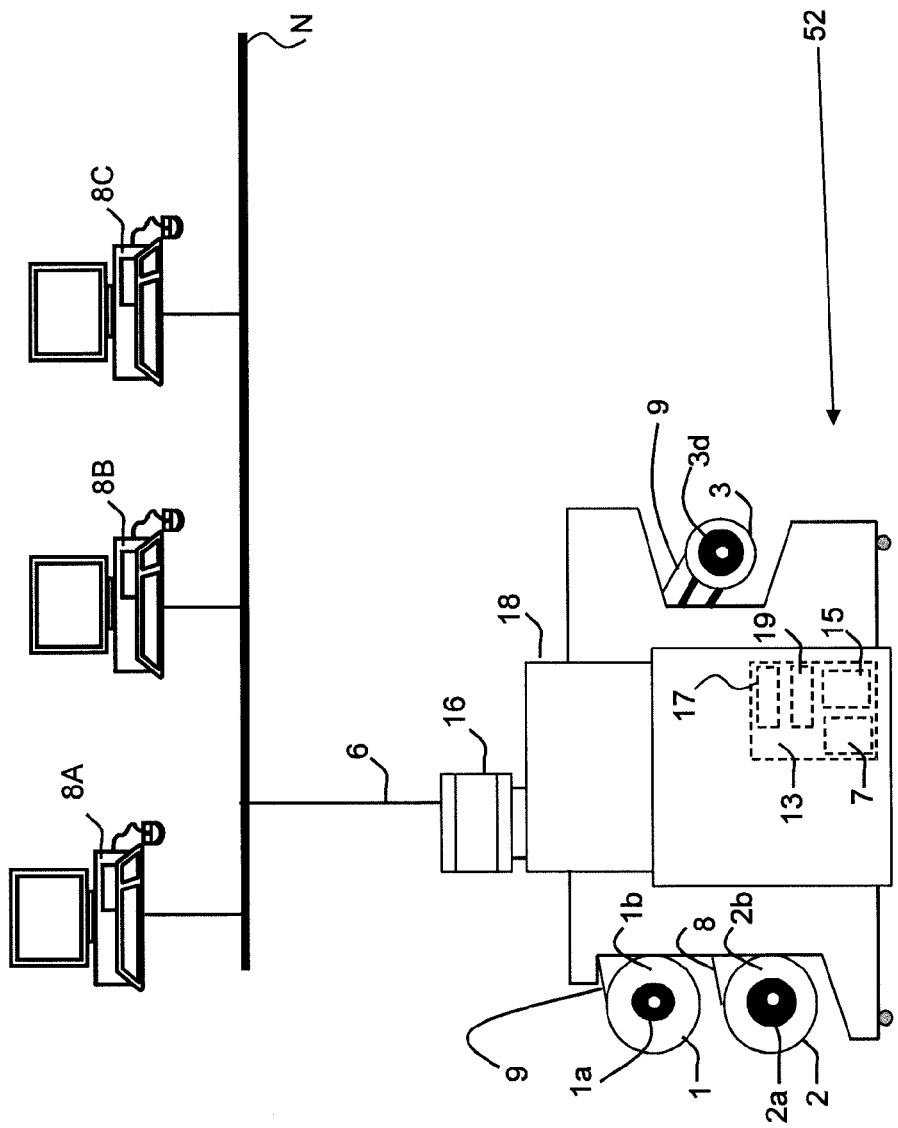

FIG. 2 illustrates another roll-to-roll printing system 52 connected to a network N. The roll-to-roll printing system 52 comprises two input holders for two input rolls 1, 2 respectively and one output holder for one output roll 3. The roll-to-roll printing system 52 comprises a user interface 16 suitable for displaying the digital image queue according to the invention by means of digital images to be printed, a digital representation of the first input roll 1, a digital representation of the second input roll 2 and a digital representation of the output roll 3.

The controller 13 is suited to store a set of digital images, to check whether or not the digital images can be printed and to submit a digital image to a print unit 18 of the roll-to-roll printing system 51 in order to be printed on the first input roll 1 or on the second input roll 2.

The roll-to-roll printing system 52 processes up at least part of the media of the first input roll 1 and at least part of media of the second input roll 2. The wound media has a length which is defined as a largest dimension of the media when unrolled. Media material may be paper, textile, transparent sheet material, plastic or any other kind of material or substrate suitable for winding up on the input roll. The input roll 1 is placed in an input holder. A side view of the first input roll 1 comprises a part 1a of the core of the input roll 1 and a side part 1b of the media of the input roll 1. The second input roll 2 is placed in another input holder.

Individual digital images will be printed on media 9 taken out from the first input roll 1 and on media 8 taken out from the second input roll 2. The individual digital images are printed by the print unit 18 of the roll-to-roll printing system 52 according to the digital image queue for the input rolls 1, 2 and the output roll 3. Firstly, the media 9 of the first input roll 1 is guided along the print unit 18 and afterwards the media 8 of the second input roll 2 is guided along the print unit 18 for printing. The printed media 9 is guided to and wound up on the core 3d of the output roll 3 in an output holder and afterwards the printed media 8 is guided to and wound up on the same core 3d of the output roll 3.

Figure 3:
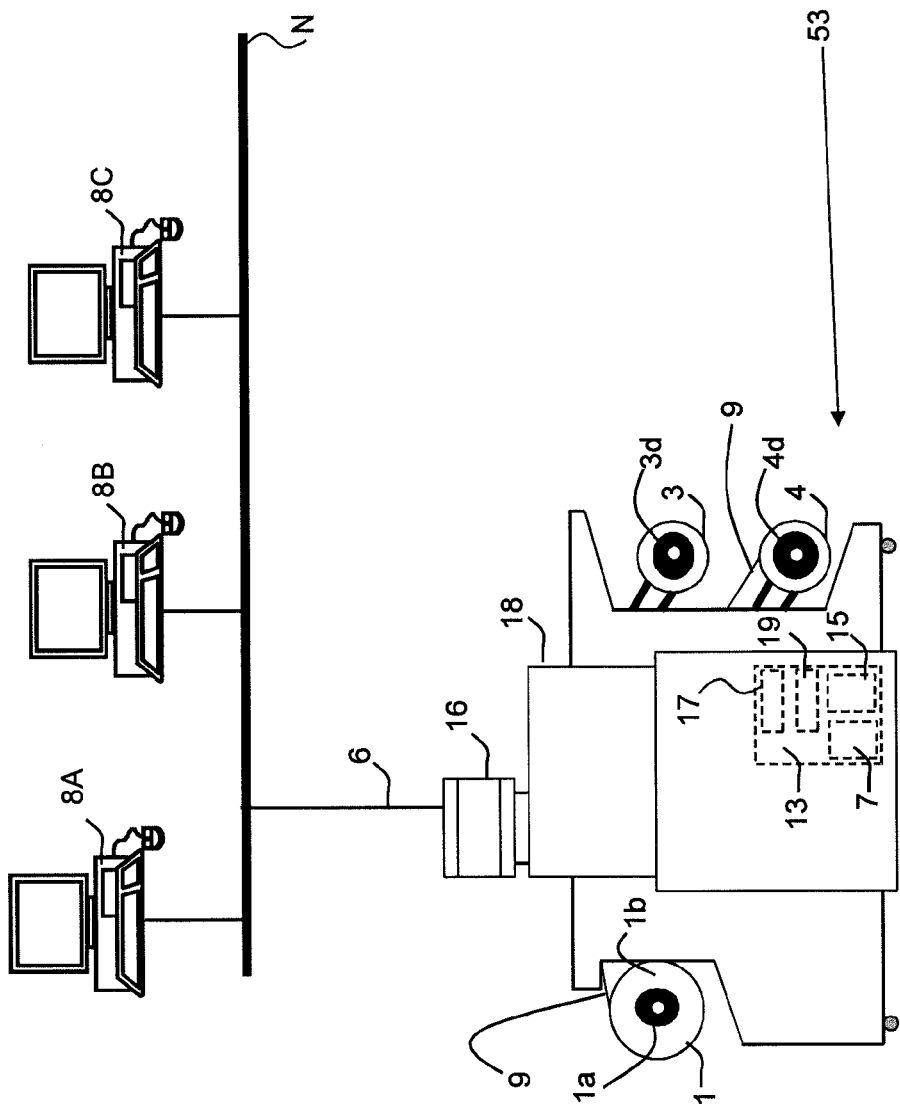

FIG. 3 illustrates another roll-to-roll printing system 53 connected to a network N. The roll-to-roll printing system 51 is available for a user working with one of the workstations 8A-8C and intending to send a digital image from one of the workstations 8A-8C to a controller 13 inside of the roll-to-roll printing system 53. The roll-to-roll printing system 53 is connected to the network N via a wired or wireless connector 6 and suited for receiving digital images from the workstations 8A-8C. The network N may be wireless. The roll-to-roll printing system 53 comprises one input holder for one input roll 1 and two output holders for two output rolls 3, 4 respectively. The roll-to-roll printing system 53 comprises a user interface 16 suitable for displaying the digital image queue according to the invention by means of digital images to be printed, a digital representation of the input roll 1, a digital representation of the first output roll 3 and a digital representation of the second output roll 4.

The controller 13 is suited to store a set of digital images, to check whether or not the digital images can be printed and to submit a digital image to a print unit 18 of the roll-to-roll printing system 53 in order to be printed on the input roll 1. Image data of a digital image are stored in digital storage 7 contained in the controller 13 at least for the time period that the digital image is printed by the print unit 18. Image data may be composed and also stored in a memory of at least one of the workstations 8A-8C.

The roll-to-roll printing system 53 processes at least part of the media of the input roll 1. The input roll 1 is placed in an input holder. A side view of the input roll 1 comprises a part 1a of the core of the input roll 1 and a side part 1b of the media of the input roll 1.

Individual digital images will be printed on media 9 taken out from the input roll 1. The individual digital images are printed by the print unit 18 of the roll-to-roll printing system 51 according to the digital image queue. The media 9 of the input roll 1 is guided along the print unit 18. The printed media 9 is guided to and wound up on the core 3d of the first output roll 3 on the output holder. If it is indicated in the digital image queue that a digital image and possible subsequent digital images need to be printed on the second output roll 4, the input roll 1 is cut by a cutting mechanism in the roll-to-roll printing system 53 (not shown) and the printed part of the input roll 1 is wound up on the first output roll 3. The remaining part of the media 9 of the input roll 1 is printed and guided to the second output roll 4.

Figure 4:
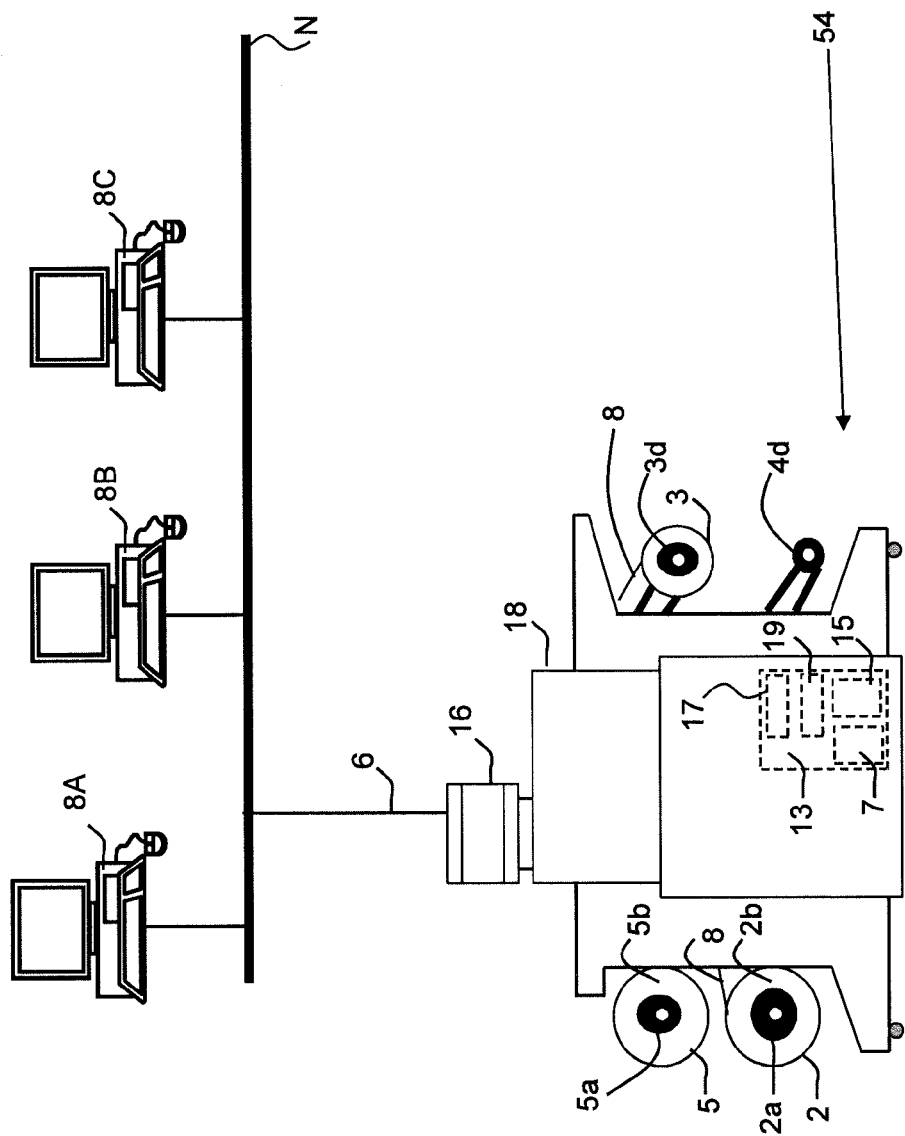

FIG. 4 illustrates another roll-to-roll printing system 54 connected to a network N. The roll-to-roll printing system 54 is available for a user working with one of the workstations 8A-8C and intending to send a digital image from one of the workstations 8A-8C to a controller 13 inside of the roll-to-roll printing system 54. The roll-to-roll printing system 54 is connected to the network N via a wired or wireless connector 6 and suited for receiving digital images from the workstations 8A-8C. The network N may be wireless. The roll-to-roll printing system 54 comprises two input holders for two input rolls 2, 5, respectively and two output holders 3d, 4d for two output rolls, respectively. The roll-to-roll printing system 54 comprises a user interface 16 suitable for displaying the digital image queue according to the invention by means of digital images to be printed, a digital representation of the input roll 5, a digital representation of the input roll 2, a digital representation of the output roll 3 and a digital representation of a possible second output roll to be wound up on core 4d.

The controller 13 is suited to store a set of digital images, to check whether or not the digital images can be printed and to submit a digital image to a print unit 18 of the roll-to-roll printing system 54 in order to be printed on the input roll 5 or on the second input roll 2. Image data of a digital image are stored in digital storage 7 contained in the controller 13 at least for the time period that the digital image is printed by the print unit 18. Image data may be composed and also stored in a memory of at least one of the workstations 8A-8C.

The roll-to-roll printing system 54 processes at least part of media of the second input roll 2. The input roll 2 is placed in an input holder. A side view of the input roll 2 comprises a part 2a of the core of the input roll 2 and a side part 2b of the media of the input roll 2. The input roll 5—not yet used but probably planned in the digital image queue for future digital images to be printed—is placed in an input holder. A side view of the input roll 5 comprises a part 5a of the core of the input roll 5 and a side part 5b of the media of the input roll 5.

Individual digital images will be printed on media 8 taken out from the input roll 2. The individual digital images are printed by the print unit 18 of the roll-to-roll printing system 54 according to the digital image queue. The media 8 of the input roll 2 is guided along the print unit 18. The printed media 8 is guided to and wound up on the core 3d of the output roll 3 on an output holder.

Figure 5:
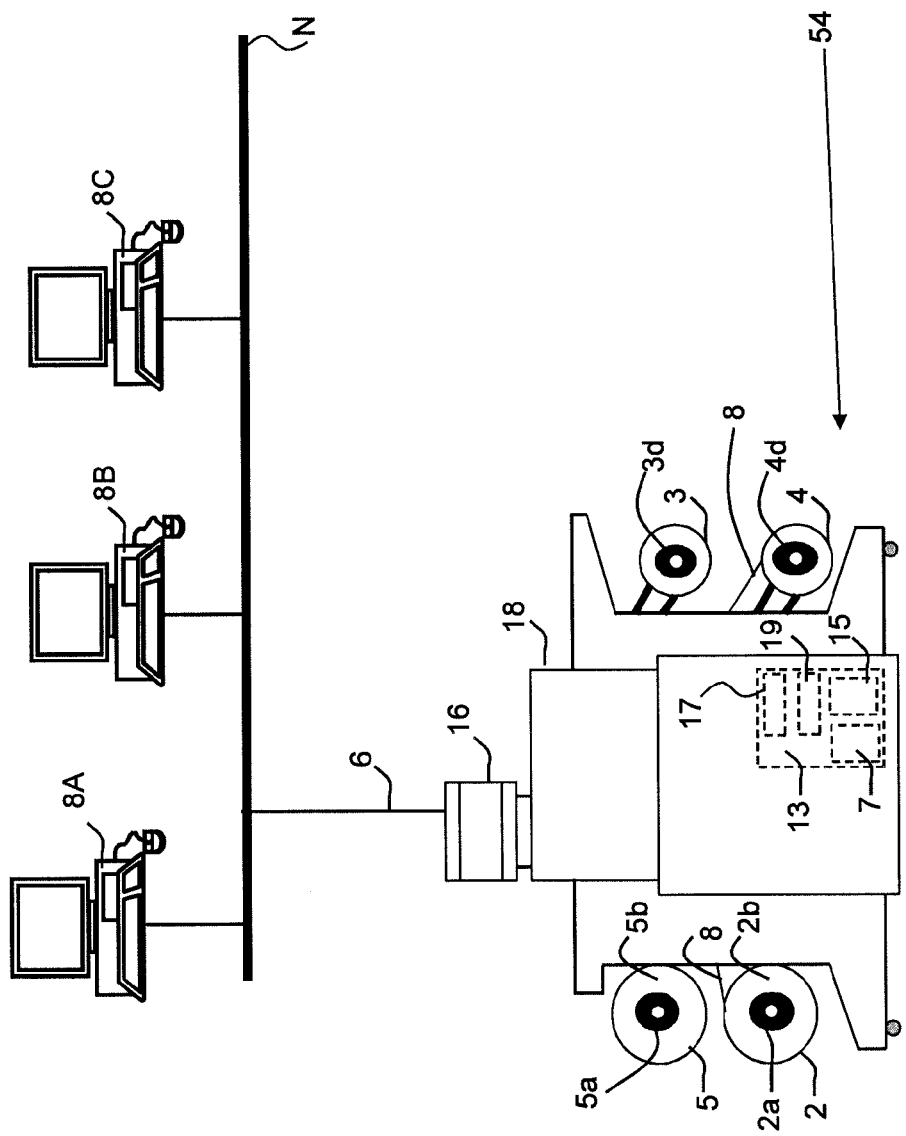

Once the next digital image to be printed is scheduled in the digital image queue to be printed on a next output roll 4, the media 8 of the input roll 2 is cut by a cutting mechanism (not shown) of the roll-to-roll printing system 54 and the printed media is wound up on the output roll 3. The remaining part of the media 8 is guided along the print unit 18, printed upon by the print unit 18 and guided to a core 4d on a next output holder in order to form an output roll 4. This situation is shown in FIG. 5.

Although the number of input holders in FIGS. 1-5 is at most two, and the number of output holders in FIGS. 1-5 is at most two, a roll-to-roll printing system according to the invention may have a larger number of input holders than two and/or a larger number of output holders than two.

Figure 6:
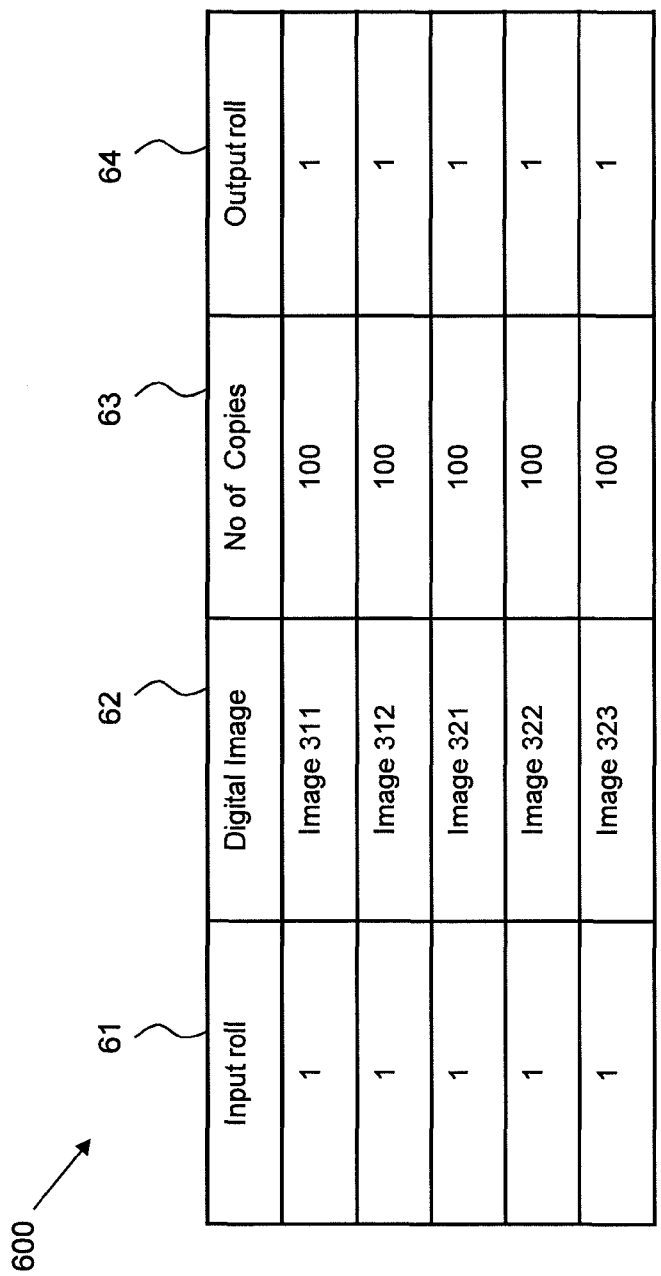

FIG. 6 schematically illustrates an internal storage representation 600 of the digital image queue usable by the scheduler 19 in the controller 13 of the roll-to-roll printing system 51 shown in FIG. 1. A first column 61 indicates an identification number 1 of the input roll. A second column 62 indicates identifications of or link to the digital images 311, 312, 321, 322, 323, which are intended to be printed on the input roll 1. A third column 63 indicates a number of copies to be printed on the first input roll 1. A fourth column 64 indicates an identification number 1 of an output roll. Other properties of a digital image in the digital image queue may be incorporated in the digital image queue by adding appropriate columns or may be linked to via the identifications of or links to the digital images 311, 312, 321, 322, 323 in the second column 62.

Values for each entry in the digital image queue may be generated automatically from submitted print jobs comprising the digital images to be printed together with a print job ticket specifying media requirements like size, media quality and desired print mode. Specifications of the input rolls like width and media quality are considered to be registered by the controller 13 of the roll-to-roll printing system 51 due to prior input by an operator. Specifications of the input rolls like width and media quality may also be registered by the controller 13 of the roll-to-roll printing system 51 by means of default values so that at a later moment in time these values may be changed by operator input via the user interface 16.

User operable digital representations of an input roll and an output roll may automatically appear on the user interface 16 if a submitted print job is received by the controller 13 and a specification of the print job is for example a new media, which has not yet been scheduled in the digital image queue to be printed upon.

Values for each entry in the digital image queue may also be entered and/or changed by means of the user interface 16 of the roll-to-roll printing system 51, since the user interface 16 is capable of displaying a constructed digital image representing the digital image queue to the operator.

FIG. 7 schematically illustrates an internal storage representation 700 of the digital image queue usable by the scheduler 19 in the controller 13 of the roll-to-roll printing system 52 shown in FIG. 2. A first column 71 indicates an identification number 1 of a first input roll or an identification number 2 of a second input roll. A second column 72 indicates identifications of or link to the digital images 311, 312, which are intended to be printed on the first input roll 1, and the digital images 321, 322, 323, which are intended to be printed on the second input roll 2. A third column 73 indicates a number of copies to be printed on the first input roll 1 or on the second input roll 2. A fourth column 74 indicates an identification number 1 of an output roll. Other properties of a digital image in the digital image queue may be incorporated in the digital image queue by adding appropriate columns or may be linked to via the identifications of or links to the digital images 311, 312, 321, 322, 323 in the second column 72.

Values for each entry in the digital image queue may be generated automatically from submitted print jobs comprising the digital images to be printed together with a print job ticket specifying media requirements like size, media quality and desired print mode. Specifications of the input rolls like width and media quality are considered to be registered by the controller 13 of the roll-to-roll printing system 52 due to prior input by an operator. Specifications of the input rolls like width and media quality may also be registered by the controller 13 of the roll-to-roll printing system 52 by means of default values so that at a later moment in time these values may be changed by operator input via the user interface 16.

User operable digital representations of an input roll and an output roll may automatically appear on the user interface 16, if a submitted print job is received by the controller 13 and a specification of the print job is for example a new media, which has not yet been scheduled in the digital image queue to be printed upon.

Values for each entry in the digital image queue may also be entered and/or changed by means of the user interface 16 of the roll-to-roll printing system 52, since the user interface 16 is capable of displaying a constructed digital image representing the digital image queue to the operator.

It is noted that the internal storage representation 700 may also be applied to a digital image queue of the roll-to-roll printing system 51. Since the roll-to-roll printing system 51 has only one input holder 1*a* (See FIG. 1), the second input roll 2 can only be loaded when the first input roll 1 is unloaded from the one input holder 1*a* or when the core of the first input roll 1 is unloaded from the one input holder in case the whole media of the first input roll has been used and printed upon.

FIG. 8 schematically illustrates an internal storage representation 800 of the digital image queue usable by the scheduler 19 in the controller 13 of the roll-to-roll printing system 53 shown in FIG. 3. A first column 81 indicates an identification number 1 of an input roll. A second column 82 indicates identifications of or link to the digital images 311, 312, which are intended to be printed and wound up on a first output roll 1, and the digital images 321, 322, 323, which are intended to be printed and wound up on the second output roll 2. A third column 83 indicates a number of copies to be printed on the input roll 1. A fourth column 84 indicates an identification number 1 of the first output roll and an identification number 2 of the second output roll. Other properties of a digital image in the digital image queue may be incorporated in the digital image queue by adding appropriate columns or may be linked to via the identifications of or links to the digital images 311, 312, 321, 322, 323 in the second column 82.

Values for each entry in the digital image queue may be generated automatically from submitted print jobs comprising the digital images to be printed together with a print job ticket specifying media requirements like size, media quality and desired print mode. Specifications of the input rolls like width and media quality are considered to be registered by the controller 13 of the roll-to-roll printing system 53 due to prior input by an operator. Specifications of the input rolls like width and media quality may also be registered by the controller 13 of the roll-to-roll printing system 53 by means of default values so that at a later moment in time these values may be changed by operator input via the user interface 16.

User operable digital representations of an input roll and an output roll may automatically appear on the user interface 16, if a submitted print job is received by the controller 13 and a specification of the print job is for example a new media, which has not yet been scheduled in the digital image queue to be printed upon.

Values for each entry in the digital image queue may also be entered and/or changed by means of the user interface 16 of the roll-to-roll printing system 53, since the user interface 16 is capable of displaying a constructed digital image representing the digital image queue to the operator.

It is noted that the internal storage representation 800 may also represent a digital image queue of the roll-to-roll printing system 51 or a digital image queue of the roll-to-roll system 52. Since roll-to-roll printing systems 51, 52 have only one output holder 3*d* (See FIGS. 1 and 2), the second output roll 2 can only be loaded when the first output roll 1 is unloaded from the one output holder 3d.

FIG. 9 schematically illustrates an internal storage representation 900 of the digital image queue usable by the scheduler 19 in the controller 13 of the roll-to-roll printing system 54 shown in FIG. 4. A first column 91 indicates an identification number 1 of a first input roll and an identification number 2 of a second input roll. A second column 92 indicates identifications of or link to the digital images 311, 312, 321, 322, which are intended to be printed and wound up on a first output roll 1, and the digital image 323, which are intended to be printed and wound up on the second output roll 2. A third column 93 indicates a number of copies to be printed on the input roll 1 or on the input roll 2. A fourth column 94 indicates an identification number 1 of the first output roll and an identification number 2 of the second output roll. Other properties of a digital image in the digital image queue may be incorporated in the digital image queue by adding appropriate columns or may be linked to via the identifications of or links to the digital images 311, 312, 321, 322, 323 in the second column 92.

Values for each entry in the digital image queue may be generated automatically from submitted print jobs comprising the digital images to be printed together with a print job ticket specifying media requirements like size, media quality and desired print mode. Specifications of the input rolls like width and media quality are considered to be registered by the controller 13 of the roll-to-roll printing system 54 due to prior input by an operator. Specifications of the input rolls like width and media quality may also be registered by the controller 13 of the roll-to-roll printing system 54 by means of default values so that at a later moment in time these values may be changed by operator input via the user interface 16.

User operable digital representations of an input roll and an output roll may automatically appear on the user interface 16, if a submitted print job is received by the controller 13 and a specification of the print job is for example a new media, which has not yet been scheduled in the digital image queue to be printed upon.

Values for each entry in the digital image queue may also be entered and/or changed by means of the user interface 16 of the roll-to-roll printing system 54, since the user interface 16 is capable of displaying a constructed digital image representing the digital image queue to the operator.

It is noted that the internal storage representation 900 may also represent a digital image queue of one of the roll-to-roll printing systems 51, 52 or 53. Since roll-to-roll printing systems 51, 52, 53 have less input holders and/or less output holders than the roll-to-roll printing system 54, use of one of the roll-to-roll printing systems 51, 52, 53 in order to print the digital images according to digital image queue represented by the internal storage representation 900 will lead to more roll changes than the use of the roll-to-roll printing system 54 therefore.

Figure 10:
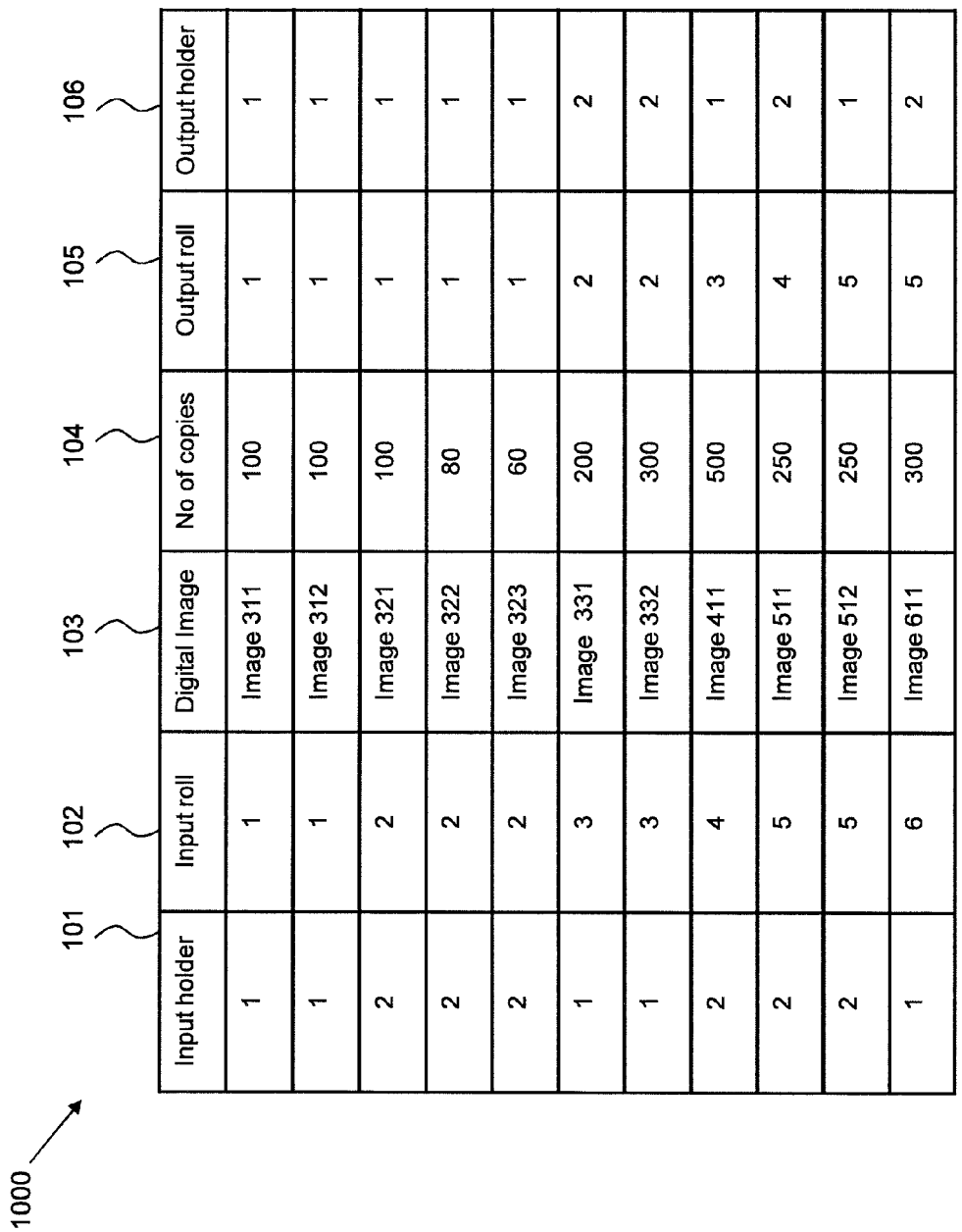

FIG. 10 schematically illustrates an internal storage representation 1000 of the digital image queue usable by the scheduler 19 in the controller 13 of any one of the roll-to-roll printing systems 51-54 shown in FIGS. 1-4, respectively. A first column 101 indicates an identification number of an input holder of the roll-to-roll printing system. An identification number 1 of a first input holder and an identification number 2 of a second input holder are shown. A second column 102 indicates identification numbers 1-6 of the respective input rolls to be used. A third column 103 indicates identifications of or links to the digital images 311, 312, 321, 322, 323, 331, 332, 411, 511, 512, 611, which are intended to be printed and wound up on the output rolls identified by the numbers 1-5 in a fifth column 105. A fourth column 104 indicates a number of copies to be printed on the respective input rolls 1-6. The fifth column 105 indicates identification numbers 1-5 of the respective output rolls. Other properties of a digital image in the digital image queue may be incorporated in the digital image queue by adding appropriate columns or may be linked to via the identifications of or links to the digital images 311, 312, 321, 322, 323, 331, 332, 411, 511, 512, 611 in the third column 103.

Values for each entry in the digital image queue may be generated automatically from submitted print jobs comprising the digital images to be printed together with a print job ticket specifying media requirements like size, media quality and desired print mode. Specifications of the input rolls like width and media quality are considered to be registered by the controller 13 of the roll-to-roll printing systems 51-54 due to prior input by an operator. Specifications of the input rolls like width and media quality may also be registered by the controller 13 of the roll-to-roll printing systems 51-54 by means of default values so that at a later moment in time these values may be changed by operator input via the user interface 16.

User operable digital representations of an input roll and an output roll may automatically appear on the user interface 16, if a submitted print job is received by the controller 13 and a specification of the print job is for example a new media, which has not yet been scheduled in the digital image queue to be printed upon.

Values for each entry in the digital image queue may also be entered and/or changed by means of the user interface 16 of the roll-to-roll printing systems 51-54, since the user interface 16 is capable of displaying a constructed digital image representing the digital image queue.

It is noted that due to the values of the input holders in the first column 101 and due to the values of the output holders in the sixth column 106, the internal storage representation 1000 as shown in FIG. 10 is suitable for representing a digital image queue of the roll-to-roll printing system 54, since roll-to-roll printing systems 51-53 have less input holders and/or less output holders than the roll-to-roll printing system 54. However, the format of the internal storage representation 1000 with six columns 101-106 may also be used in any one of the roll-to-roll printing systems 51-53 with switching of input rolls in the input section of the roll-to-roll printing system 51-53 and switches of output rolls in the output section of the roll-to-roll printing system 51-53.

Figure 11:
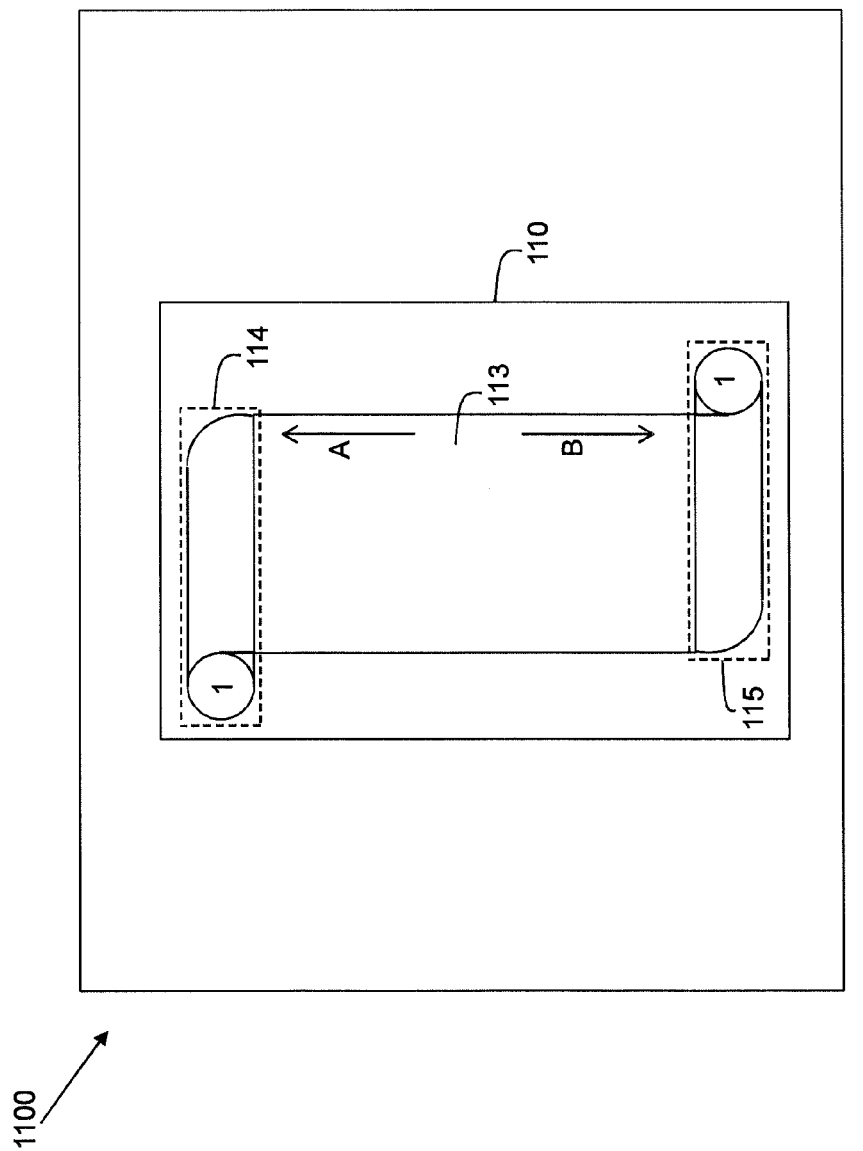
FIGS. 11-18 schematically illustrate windows on the user interface of the roll-to-roll system comprising a representation of the digital image queue according to the present invention.

FIG. 11 illustrates a user interface screen 1100 comprising a first constructed composed digital image 110 according to the invention. The first constructed composed digital image 110 comprises a digital representation 114 corresponding to a first input roll numbered 1 and a digital representation 115 corresponding to a first output roll numbered 1. The digital representation 114 is an input roll digital operable item for the operator. The digital representation 115 is an input roll digital operable item for the operator. The space between the digital representation 114 and the digital representation 115 is provided as a surface 113 on which digital images to be printed on the first input roll 1 may be shown and may be deposited.

The digital representation 114 of the first input roll numbered 1 is selectable by touching or clicking in an operable area surrounded by a dashed rectangle 114. The digital representation 115 of the first output roll numbered 1 is selectable by touching or clicking in an operable area surrounded by a dashed rectangle. For example, a selected digital representation 114 may be moved—for example dragged—to a new location in the composed digital image 110 in a direction A or B.

The digital representation 114 of the first input roll numbered 1 may comprise user operable property representations (not shown) of properties of the first input roll numbered 1. The digital representation 115 of the first output roll numbered 1 may comprise user operable property representations (not shown) of properties of the first output roll numbered 1.

A property of a roll may be a media width of the roll, a media type of the roll, a media weight of the roll, a media color of the roll, a left margin or a right margin of the digital images to be printed on the roll, etc. Such a property representation is editable and may be changed into a new value of the property. For example, when a new value is entered for the property of the first input roll numbered 1, an automatic change of the same property in entries of the digital image queue corresponding to digital images, which are intended to be printed on the first input roll numbered 1, is performed by the controller of the roll-to-roll printing system. A finishing property of the roll, for example laminating, may be mentioned in the digital representation 114.

According to an embodiment, the digital representation 114 of the first input roll numbered 1 comprises status information of the first input roll numbered 1. The status information may be a number of length units of the first input roll numbered 1 that have been printed together with a number of length units of the total length of the first input roll numbered 1. The status information may be a number of time units of the first input roll numbered 1 that still has to lapse until the first input roll numbered 1 is completely printed together with a number of time units of the total scheduled time of printing on the first input roll numbered 1.

Figure 12:
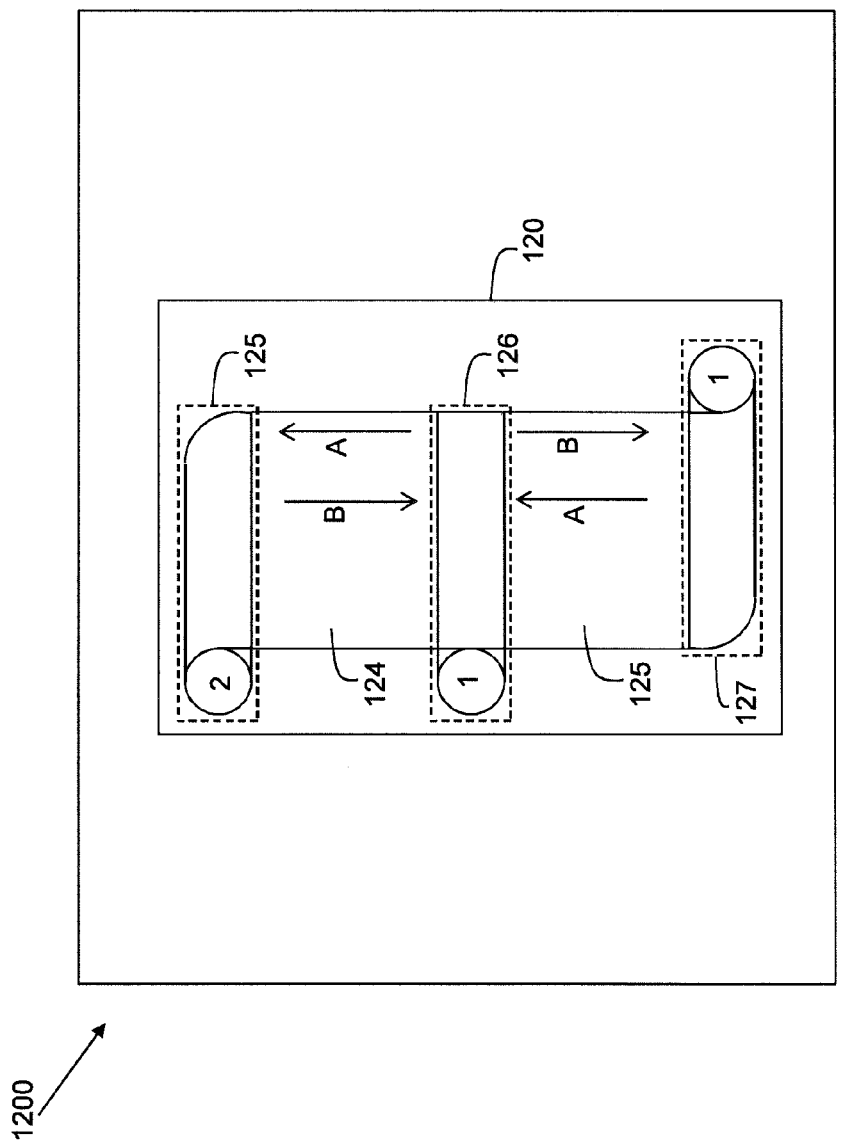

FIG. 12 illustrates two input rolls numbered 1, 2 and one output roll numbered 1. However the invention is not limited to two input rolls but may be applied to any plurality of input rolls. Depending on the dimensions of the user interface screen 1200, the dimensions of the digital representations of the input rolls of the plurality of input rolls, and on the scaling factor applied to a constructed composed digital image 120, the number of displayed input rolls may vary. According to an embodiment, scrolling backward and forward through the digital representations of the input rolls in the constructed composed digital image 120 is achieved by scrolling signs (not shown) for backward, respectively forward scrolling. If the user interface screen 1200 is a touch screen, forward scrolling is achieved by applying swiping gestures to the constructed composed digital image 120 in a first direction A corresponding to the length direction of the constructed composed digital image 120, and backward scrolling is achieved by applying swiping gestures to the constructed composed digital image 120 in a second direction B corresponding to the length direction of the constructed composed digital image 120.

The second constructed composed digital image 120 comprises a digital representation 126 corresponding to the first input roll numbered 1, a digital representation 125 corresponding to the second input roll numbered 2 and a digital representation 127 corresponding to the first output roll numbered 1.

An area 124 may be used to show digital images to be printed on the second input roll numbered 2. An area 125 may be used to show digital images to be printed on the first input roll numbered 1.

The sequence order of the locations of the digital representations 126, 125 of the input rolls numbered 1, 2, respectively reflect the chronological order in which media of the input rolls numbered 1, 2 is guided to the print unit 18 for printing. The digital representation 126 is closest to the digital representation 127 of the output roll numbered 1 to indicate that the first input roll 1 is firstly guided to the print unit 18 for printing. The digital representation 125 is more distant from the digital representation 127 of the output roll numbered 1 than the digital representation 126 in order to indicate that the second input roll numbered 2 is secondly guided to the print unit 18 for printing after the first input roll 1 is completely unwound, guided along the print unit 18 and wound up on the one output roll numbered 1.

Each digital representation 125, 126 of an input roll numbered 2, 1, respectively is selectable by touching or clicking in an operable area 125, 126 in the first constructed composed digital image 120. A selected digital representation 125, 126 may be moved—for example dragged—to a new location in the composed digital image 120 in a direction A or B. By doing so, the sequence order of the digital representations 125, 126 may be changed. In the memory of the controller 13 of the roll-to-roll system 51-54, the chronological order of printing on the plurality of input rolls numbered 1, 2 is then also changed according to the new location of the selected digital representation being the input roll digital operable item. This is advantageous for a flexible planning of the sequence order of the plurality of input rolls numbered 1, 2.

Figure 13:
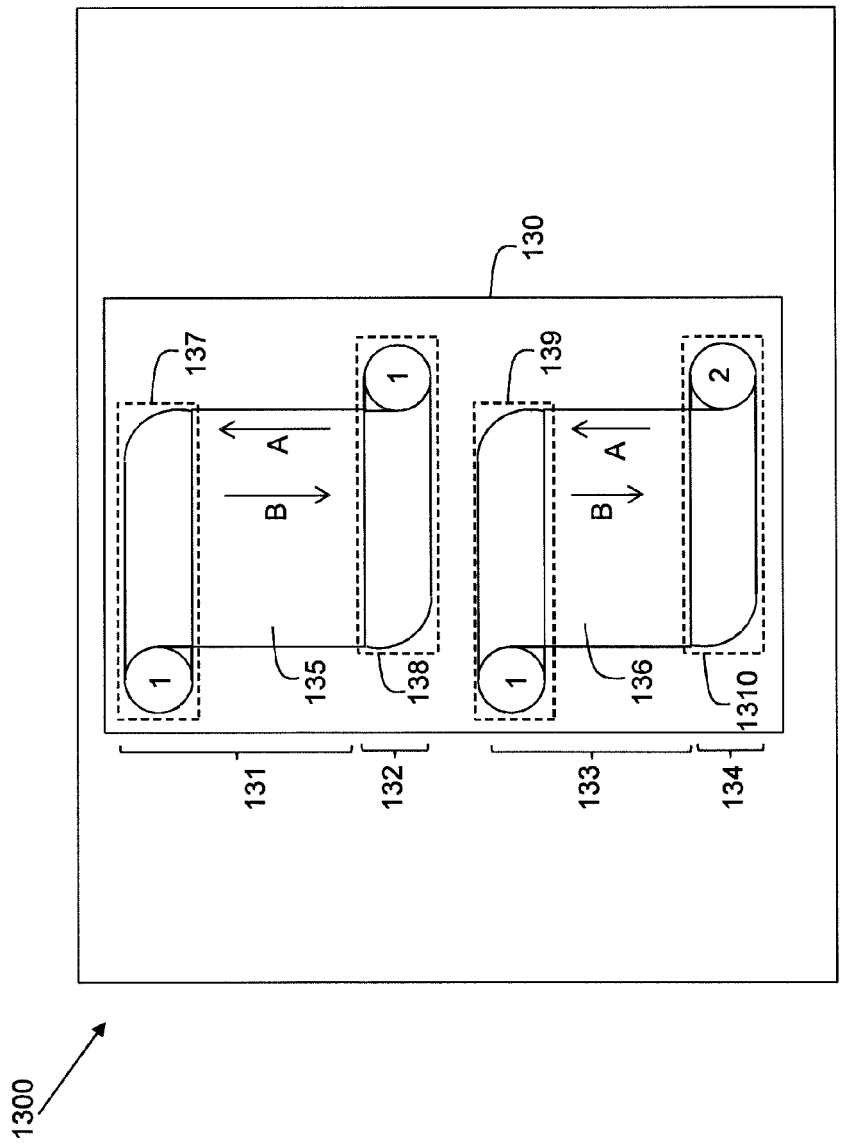

FIG. 13 illustrates in a user interface screen 1300 a constructed composed digital image 130 comprising digital representations 137, 138, 139, 1310 of one input roll numbered 1 and two output rolls numbered 1, 2. However, the invention is not limited to two output rolls but may be applied to any plurality of output rolls. Depending on the dimensions of the user interface screen 1300, the dimensions of the digital representations of the output rolls of the plurality of output rolls, and on the scaling factor applied to the constructed composed digital image 130, the number of displayed output rolls may vary. According to an embodiment, scrolling backward and forward through the digital representations of the output rolls in the constructed composed digital image 130 is achieved by scrolling signs (not shown) for backward, respectively forward scrolling. If the user interface screen 1300 is a touch screen, forward scrolling is achieved by applying swiping gestures to the constructed composed digital image 130 in a first direction A corresponding to the length direction of the constructed composed digital image 130, and backward scrolling is achieved by applying swiping gestures to the constructed composed digital image 130 in a second direction B corresponding to the length direction of the constructed composed digital image 130.

The input roll numbered 1 is used to be printed upon and to form a first output roll numbered 1 as shown in areas 131, 132, respectively. Then, the media of the input roll numbered 1 is cut and the remaining media of the input roll numbered 1 is printed upon and guided to the second output roll numbered 2 as shown in areas 133, 134, respectively. A first surface area 135 may be used to show digital images to be printed on the input roll numbered 1 in order to form the first output roll numbered 1. A second surface area 136 may be used to show digital images to be printed on the input roll numbered 1 in order to form the second output roll numbered 2.

Figure 14:
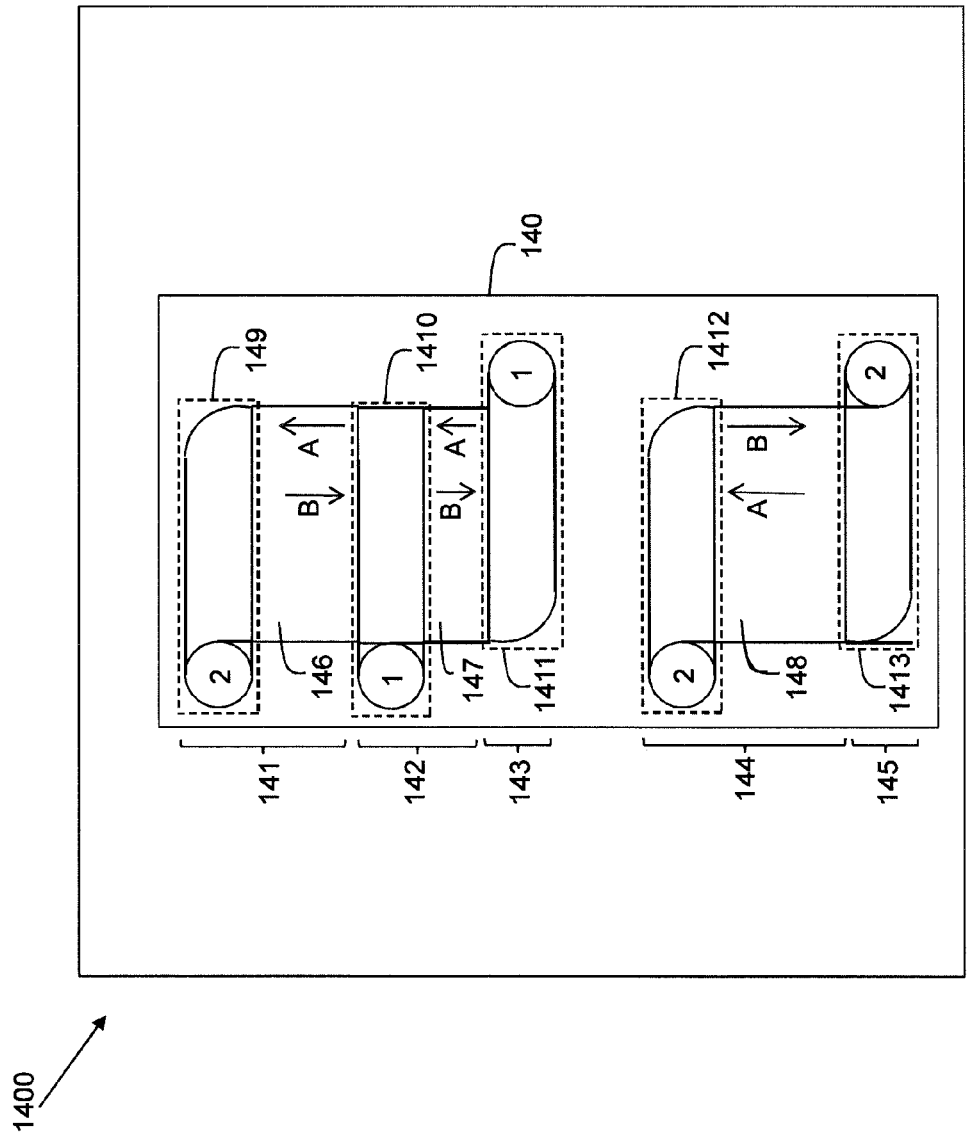

FIG. 14 illustrates in a user interface screen 1400 a constructed composed digital image 140 comprising digital representations 149, 1412 of an input roll numbered 2, a digital representation 1410 of an input roll numbered 1, a digital representation 1411 of an output roll numbered 1, and a digital representation 1413 of an output roll numbered 2. However, the invention is not limited to two input rolls and/or two output rolls but may be applied to any plurality of input rolls and/or a plurality of output rolls.

The input roll numbered 1 and the input roll numbered 2 are used to be printed upon and to form a first output roll numbered 1 as shown in areas 141, 142, 143, respectively. The media of the input roll numbered 1 is unwound from an input holder, printed upon and wound up on an output holder to form the first output roll numbered 1. Then, the media of the second input roll numbered 2 is partially unwound from the second input roll numbered 2, printed upon and wound up on the output roll numbered 1. The unprinted media of the second input roll numbered 2 is—automatically or manually—cut, and digital images are printed upon the unprinted media, which is guided to an output holder in order to form the second output roll numbered 2 as shown in areas 144, 145, respectively.

A surface area 146 may be used to show digital images to be printed on the input roll numbered 2 in order to form part of the first output roll numbered 1. A surface area 147 may be used to show digital images to be printed on the input roll numbered 1 in order to form part of the first output roll numbered 1. A surface area 148 may be used to show digital images to be printed on the input roll numbered 2 in order to form the second output roll numbered 2.

Figure 15:
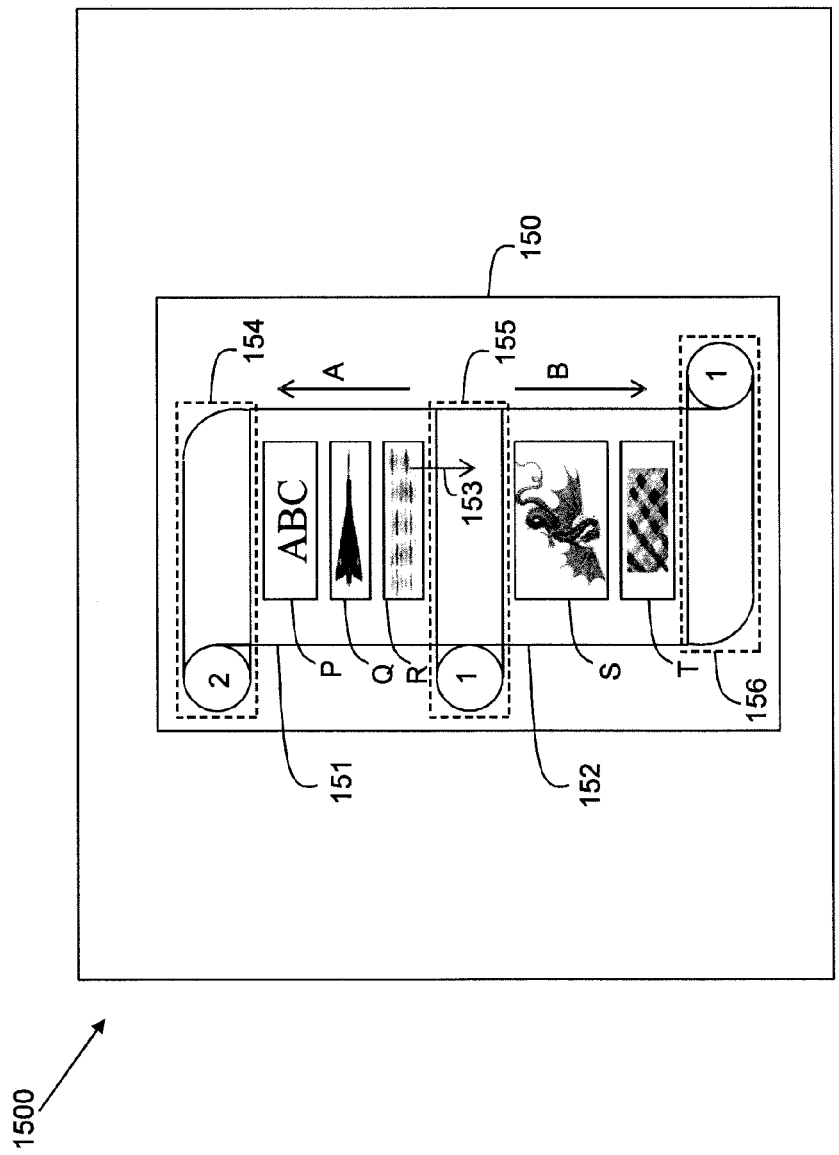

FIG. 15 illustrates—in addition to the constructed composed digital images 110, 120, 130, 140 shown in FIG. 11-14, respectively—a constructed digital image 150 according to the invention, which comprises digital representations S, T of digital images displayed in a surface area 152 and to be printed on a first input roll numbered 1, and digital representations P, Q, R of digital images displayed in a surface area 151 and to be printed on a second input roll numbered 2. The first and second input roll numbered 1, 2, respectively are going to form the output roll numbered 1 shown in area 156.

A sequence order of the locations of the digital representations S, T of the digital images to be printed on the first input roll numbered 1 reflects the chronological order in which the digital images are printed on the media of the first input roll numbered 1. The sequence order of the locations of the digital representations P, Q, R of the digital images to be printed on the second input roll numbered 2 reflects the chronological order in which the digital images are printed on the media of the second input roll numbered 2.

Therefore, on the output roll numbered 1, the printed digital image T is closest to the core of the output roll numbered 1, the printed digital image S is then closest to the core, the printed digital image R is then closest to the core, etc.

Each of the plurality of individual digital images may be selected and dragged one surface area 151, 152 to the other surface area 151, 152, from a surface area 151, 152 to an area 154, 155 representing an input roll or to an area 156 representing an output roll. For example, the digital image R may be dragged from the surface area 151 to the area 155 as shown by the arrow 153 in order to schedule the digital image R to be printed on the first input roll numbered 1 instead of to be printed on the second input roll numbered 2.

Each time an individual digital image is dragged and intended to be dropped to the another area in the constructed composed digital image 150, the controller checks if there is enough media left for the individual digital image on the appropriate input roll. A warning for an end-of-roll situation, respectively a start-of-roll situation, may be shown in the constructed composed digital image 150 at the appropriate locations.

Figure 16:
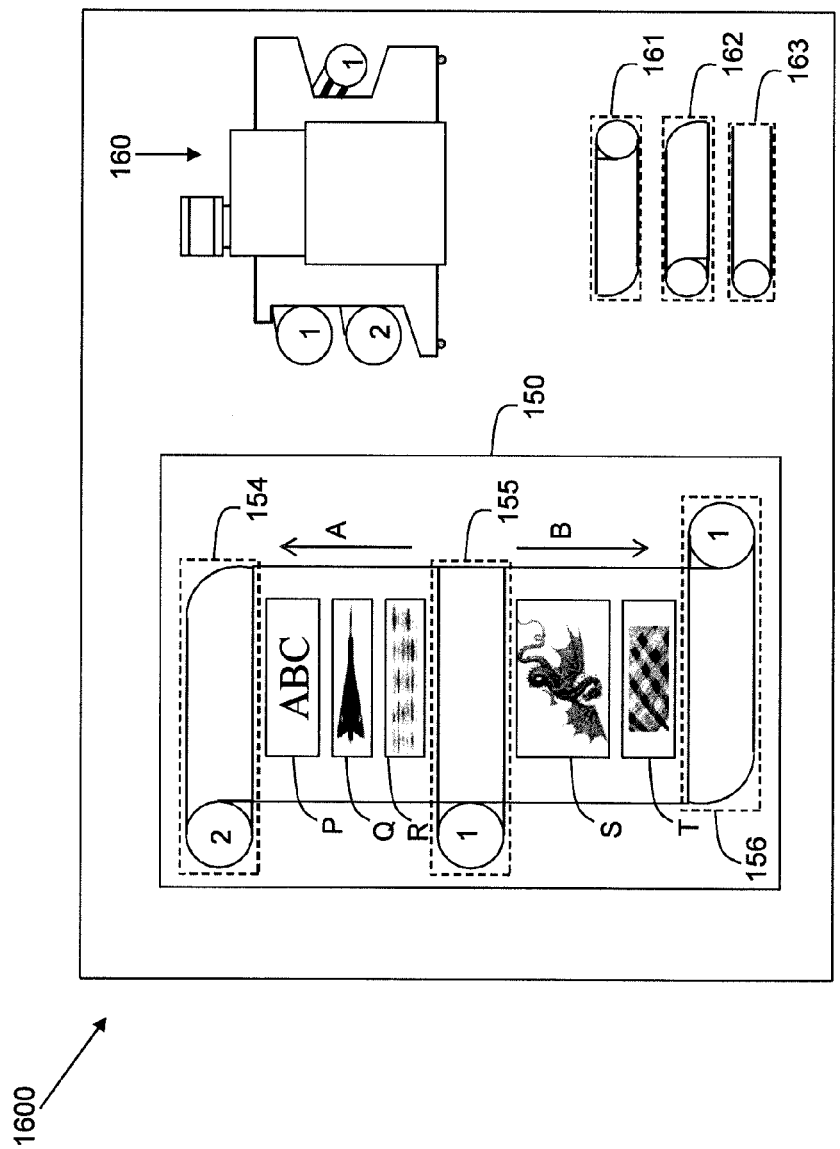

FIG. 16 illustrates a user interface screen 1600 with functionality additional to FIG. 15. FIG. 16 illustrates again the constructed composed digital image 150, a digital image 160 representing the roll-to-roll printing system, and digital images 161, 162, 163. The digital image 160 indicates where the input rolls numbered 1 and 2 have to be loaded on the left side of the roll-to-roll printing system and where the core of the output roll numbered 1 has to be loaded on the right side of the roll-to-roll printing system.

The digital images 161, 162, 163 represent building blocks of an output roll, a first kind of input roll and a second kind of input roll, respectively. The first kind of input roll is a last input roll to form an output roll, while the second kind of input roll is a first or intermediate input roll in the case that more than one input roll is forming an output roll. Further kinds of input rolls may be envisioned. Further kinds of building blocks may be envisioned. The building blocks may be used to construct the composed digital image 150 by dragging the digital images 161, 162, 163 to the appropriate positions in the area of the composed digital image 150.

Figure 17:
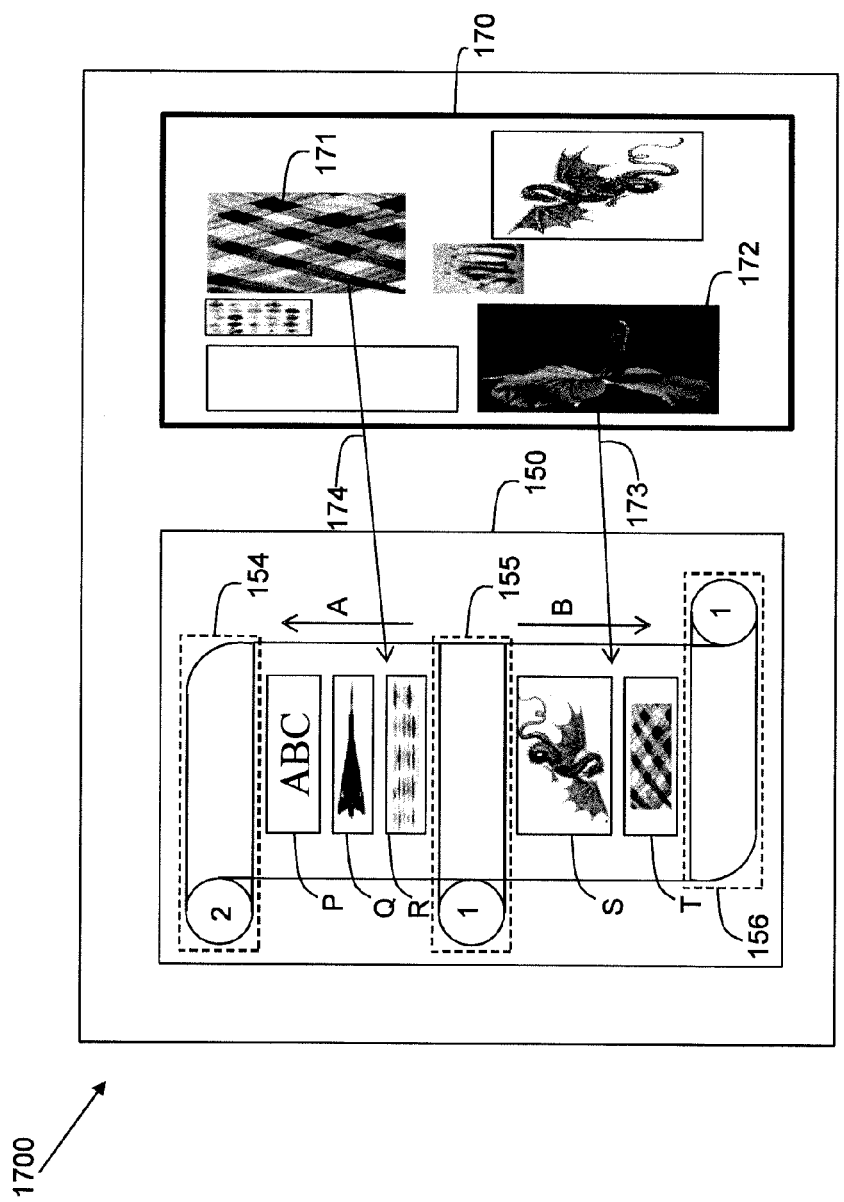

FIG. 17 illustrates a user interface screen 1700 with functionality additional to FIG. 15. FIG. 17 illustrates again the constructed composed digital image 150 and a window 170 comprising a plurality of individual digital images. The window 170 may represent a particular part of the memory such as a hot folder or an image file directory. The window 170 represents a digital user operable pool item according to the invention. Each of the plurality of individual digital images may be selected and dragged from the window 170 and dropped on the constructed composed digital image 150. A first individual digital image 171 may be added to the constructed composed digital image 150 by dragging and dropping the first individual digital image 171 onto a place at the constructed composed digital image 150 indicated by a first arrow 174. A second individual digital image 172 may be added to the constructed composed digital image 150 by dragging and dropping the second individual digital image 172 onto a place at the constructed composed digital image 150 indicated by a second arrow 173.

Each time an individual digital image is added to the constructed composed digital image 150, the controller checks if there is enough media left for the individual digital image on the appropriate input roll. A warning for an end-of-roll situation, respectively a start-of-roll situation, may be shown in the constructed composed digital image 150 at the appropriate locations.

Instead of dragging and dropping an image on the user interface screen 1700, which is a touch screen, the image may be selected by a mouse and moved by means of the mouse to the desired place on the constructed composed digital image 150. An image may also be dragged and dropped onto a place between two images already placed on the constructed composed digital image 150. In this way, the sequence order of images in the constructed composed digital image 150 may be changed. This is allowed as long as the two images on the constructed composed digital image 150 are not yet printed. The images on the constructed composed digital image 150 may also be moved as long as they are not yet printed on the corresponding input roll.

In an embodiment of the present invention, the user interface is provided with a zoom function for zooming in on or out of the constructed composed digital image 150. The zoom function may be realized with a zoom in button and a zoom out button. In case of a touch screen, the zoom function may be realized by pinching or spreading by two fingers at a digital image in a digital presentation of an input roll in the constructed composed digital image 150. By zooming in, the digital representations of the images to be printed become more detailed and more visible for an operator.

According to an embodiment of the present invention, the individual digital images P, Q, R, S, T are represented by thumbnail images. Each thumbnail image may be placed on a grey background digital image, which is displayed on the digital representation of the corresponding input roll to indicate an area on the input roll at which the digital image corresponding to the thumbnail image in the grey background digital image is printed. The background image may also comprise additional information such as the file name of the individual digital image, the last amended date of the individual digital image, the usage of each color when printing the individual digital image and an absolute end time when the printing of the individual digital image is completed.

Figure 18:
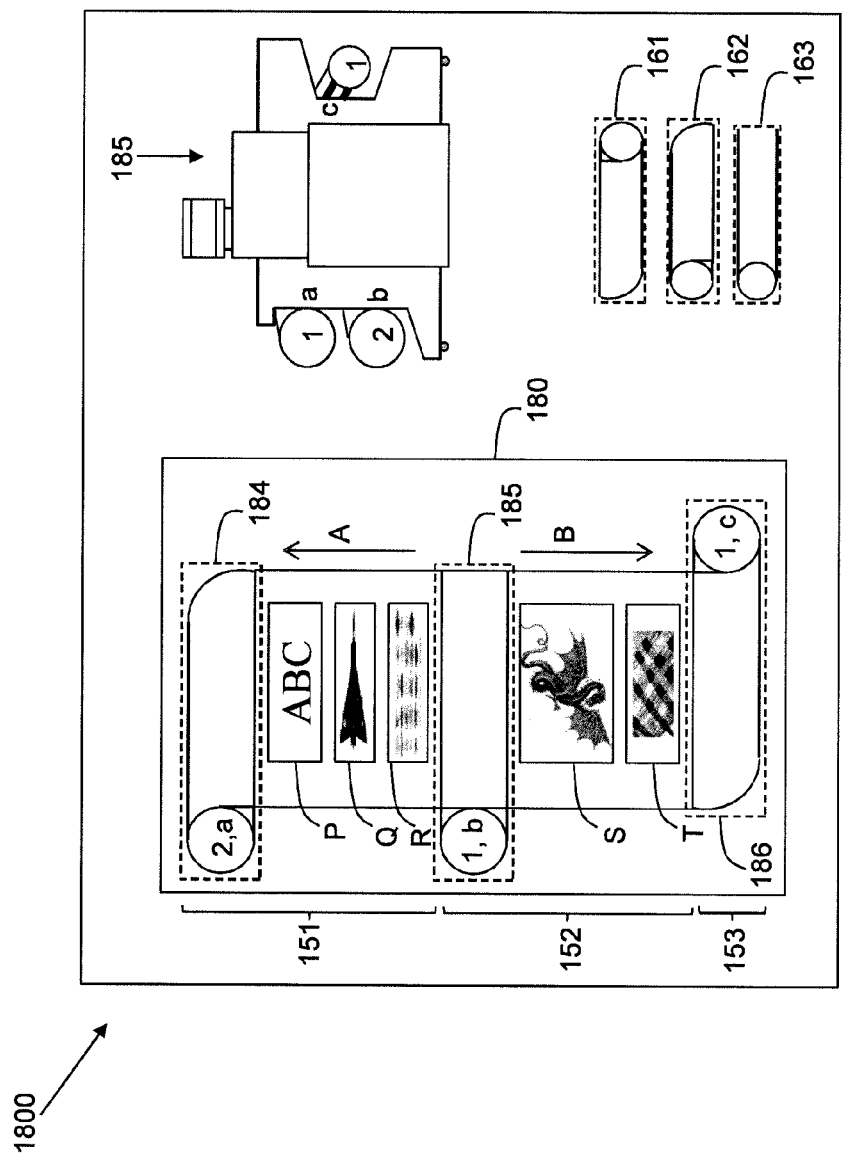

FIG. 18 illustrates a user interface screen 1800 with functionality additional to FIG. 15. FIG. 18 illustrates an example of a constructed composed digital image 180 resembling constructed composed digital image 150 in FIG. 15, a digital image 185 representing the roll-to-roll printing system, and digital images 161, 162, 163. The digital image 185 indicates where the input rolls numbered 1 and 2 have to be loaded on the left side of the roll-to-roll printing system and where the core of the output roll numbered 1 has to be loaded on the right side of the roll-to-roll printing system. The digital image 185 additionally indicates where the input holders a, b are located in the roll-to-roll printing system and where the output holder c is located in the roll-to-roll printing system.

The constructed composed digital image 180 comprises areas 184, 185, 186 to represent the input rolls numbered 1, 2 and output roll numbered 1. Additionally the areas 184, 185, 186 comprise indicating items a, b, c representing the input holders a, b and the output holder c of the roll-to-roll printing system. This is advantageous, since a coupling between rolls and holders as established in a digital image queue 1000 according to FIG. 10 is now made visible in the user interface screen 1800 for this example.

The functionality shown in FIGS. 16-18 may be combined in one user interface screen. User interface screens 1100-1800 in FIG. 11-18, respectively may comprise a switch button or two alternative buttons in order to be able to switch between the embodiments of the respective user interface screens.

Figure 19:
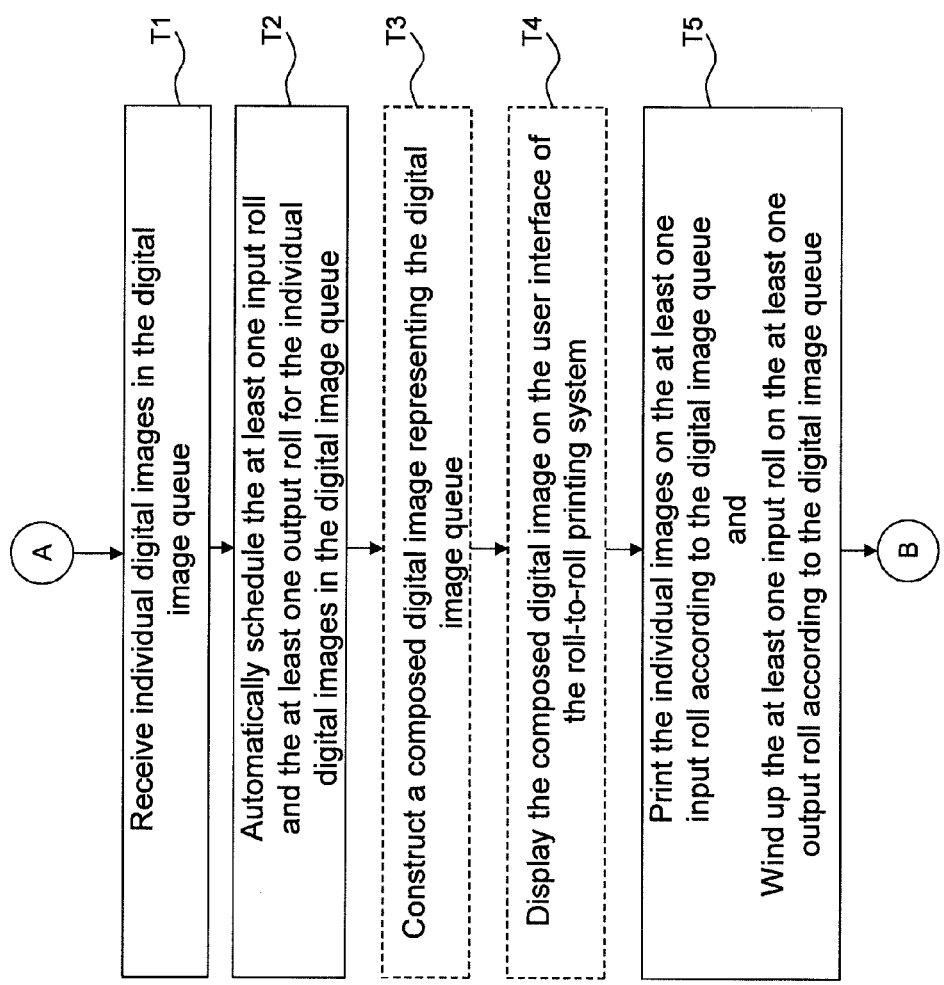
FIGS. 19-20 are flow diagrams of the method according to the present invention.

FIG. 19 is a first flow diagram of the method according to the invention. From a starting point A, a first step T1 is reached.

In the first step T1, individual digital images intended to be printed are received in the digital image queue. This may be done via a composed digital image, which is constructed according to the invention or via the controller, which has received submitted print jobs containing the individual digital images. The media properties for the media needed for printing the digital images are present in the print jobs and stored in memory of the controller.

In a second step T2, the at least one input roll and the at least one output roll is automatically scheduled for the individual digital images in the digital image queue. Input roll identifications and output roll identifications are added to the digital image queue. Input holder identifications and output holder identifications may be added to the digital image queue.

In a third facultative step T3, a composed digital image representing the digital image queue is constructed by the construction module in the controller of the roll-to-roll printing system.

In a fourth facultative step T4, the constructed composed digital image is displayed on the user interface of the roll-to-roll printing system.

In a fifth step T5, the individual images are printed on the at least one input roll according to the digital image queue and at least part of the at least one input roll is wound up on the at least one output roll according to the digital image queue. The printing may be started automatically or after pressing a print start button, which may be implemented on one of the user interface screen 1100-1800.

The method ends in end point B.

Figure 20:
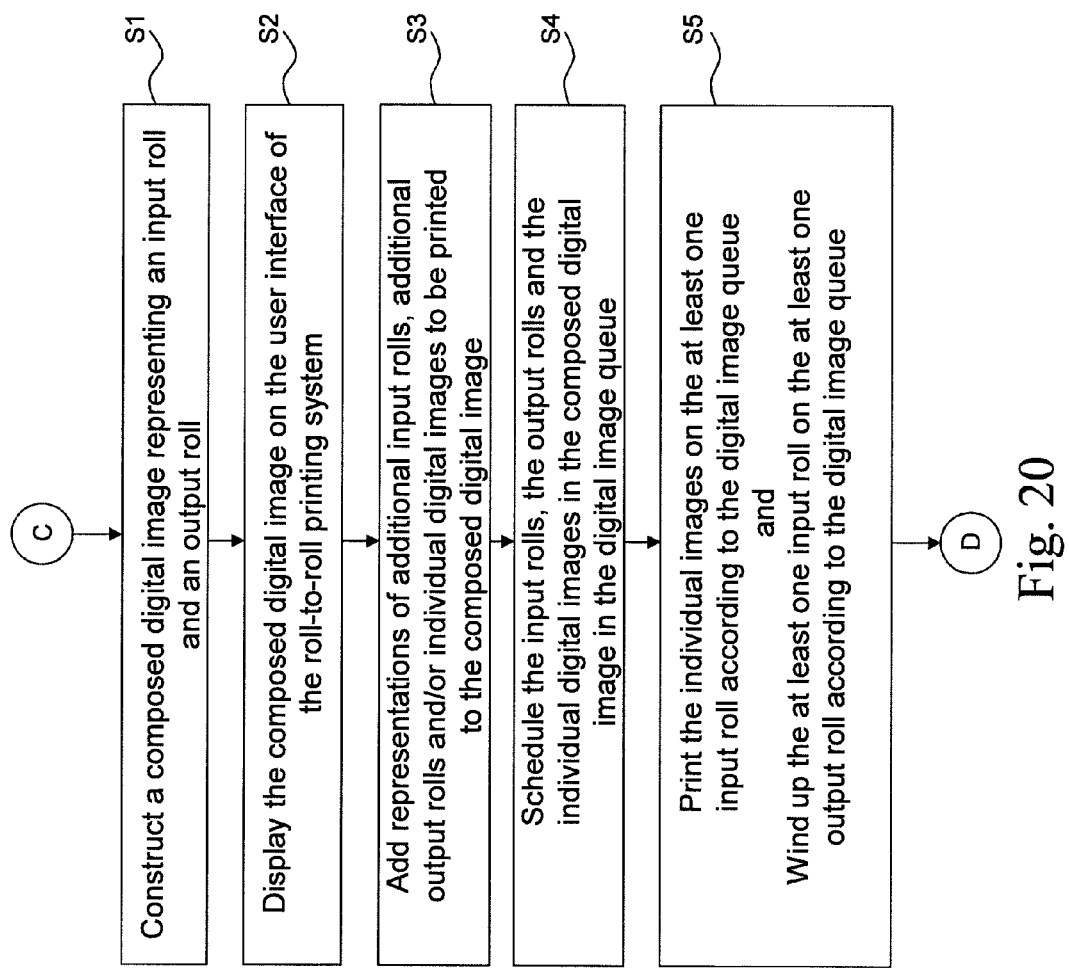

FIG. 20 is a second flow diagram of the method according to the invention. From a starting point C, a first step S1 is reached.

In the first step S1, a simple composed digital image representing an input roll and an output roll is constructed by the construction module of the controller of the roll-to-roll printing system according to the invention.

In a second step S2, the constructed composed digital image is displayed on the user interface of the roll-to-roll printing system.

In a third step S3, the operator is allowed to add representations of additional input rolls, representations of additional output rolls and/or representations of additional digital images to the constructed composed digital image.

In a fourth step S4, the input rolls, the output rolls and the individual digital images are scheduled in the digital image queue of the roll-to-roll printing system according to the invention.

In a fifth step S5, the individual images are printed on the at least one input roll according to the digital image queue and at least part of the at least one input roll is wound up on the at least one output roll according to the digital image queue. The printing may be started automatically or after pressing a print start button, which may be implemented on one of the user interface screen 1100-1800.

The method ends in end point D.

The flow diagrams in FIGS. 19-20 are merely exemplary. Combinations of flow diagrams in FIGS. 19-20 may be envisioned, even provided with additional steps according to the embodiments of the digital image queue as shown in FIGS. 6-10 and the user interface screens as shown in FIGS. 11-18.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for printing digital images on at least one input roll of media in order to form at least one output roll by means of a roll-to-roll printing system, the roll-to-roll printing system comprising a digital image queue comprising an entry for each digital image to be printed, the method comprising the steps of:
   registering a first digital item in an entry of the digital image queue, the first digital item identifying the digital image and digital items of print properties of the digital image;
   printing the digital image according to the order of the entry in the digital image queue;

registering a second digital item in the entry of the digital image queue, the second digital item identifying an input roll on which the digital image is going to be printed and a third digital item identifying an output roll on which the printed digital image is going to be wound, displaying the entry of the digital image queue by means of user operable digital representations of the digital items of the entry on a user interface of the roll-to-roll printing system, displaying a user operable digital pool item on the user interface, the user operable digital pool item comprising a plurality of representations of digital images to be printed;

dragging a digital image from the user operable digital pool item to a position among the user operable digital representations of the digital image queue; and creating a new entry for the digital image at a location in the digital image queue, which location corresponds to said position.

2. The method according to claim 1, further comprising the step of moving the entry of the digital image queue to a first other location in the digital image queue within a group of entries having the same second digital item by moving the corresponding user operable digital representations.

3. The method according to claim 2, wherein the first other location is a last entry in the group of entries having the same second digital item.

4. The method according to claim 1, further comprising the step of moving the entry of the digital image queue to a second other location in the digital image queue within a group of entries having the same third digital item by moving the corresponding user operable digital representations.

5. The method according to claim 4, wherein the second other location is a last entry in the group of entries having the same third digital item.

6. The method according to claim 1, further comprising the step of moving a group of entries having a same second digital item by moving, in one move action, a group of corresponding user operable digital representations on the user interface.

7. The method according to claim 1, further comprising the step of moving a group of entries having a same third digital item by moving, in one move action, a group of corresponding user operable digital representations on the user interface.

8. The method according to claim 1, further comprising the steps of:
displaying the user operable digital item representing an input roll scheduled in the digital image queue on the user interface together with a user operable property representation of a property of the scheduled input roll;
changing the property representation to a new value of the property; and
automatically changing the same property in entries of the digital image queue with the second digital item having a value corresponding to the scheduled input roll.

9. The method according to claim 1, wherein the entry comprises a fourth digital item identifying an input holder for an input roll identified in the second digital item and a fifth digital item identifying an output holder for an output roll identified in the third digital item.

10. A non-transitory recording medium comprising computer executable program code configured to instruct a computer to perform the method according to claim 1.

11. A roll-to-roll printing system for printing digital images comprising:
at least one input holder for holding at least one input roll of media;
a print engine to print digital images on media unwound from the at least one input roll in order to form at least one output roll of the printed media;
at least one output holder for holding at least one output roll of the printed media;
a controller comprising a digital image queue comprising an entry for each digital image to be printed, the entry comprising a first digital item identifying the digital image and digital items of print properties of the digital image; and
a user interface for displaying and manipulating an entry of the digital image queue,
wherein the entry comprises a second digital item identifying an input roll on which the digital image is going to be printed and a third digital item identifying an output roll on which the printed digital image is going to be wound, and
wherein the controller is configured to:
display the entry of the digital image queue by means of user operable digital representations of the digital items of the entry on a user interface of the roll-to-roll printing system,
display a user operable digital pool item on the user interface, the user operable digital pool item comprising a plurality of representations of digital images to be printed;
drag a digital image from the user operable digital pool item to a position among the user operable digital representations of the digital image queue; and
create a new entry for the digital image at a location in the digital image queue, which location corresponds to said position.

12. The roll-to-roll printing system according to claim 11, wherein the entry comprises a fourth digital item identifying an input holder for an input roll identified in the second digital item and a fifth digital item identifying an output holder for an output roll identified in the third digital item.

13. The roll-to-roll system according to claim 11, wherein the controller is configured to execute the method according to claim 1.

14. A method for printing digital images on at least one input roll of media in order to form at least one output roll by means of a roll-to-roll printing system, the roll-to-roll printing system comprising a digital image queue comprising an entry for each digital image to be printed, the method comprising the steps of:
registering a first digital item in an entry of the digital image queue, the first digital item identifying the digital image and digital items of print properties of the digital image;
printing the digital image according to the order of the entry in the digital image queue; and
registering a second digital item in the entry of the digital image queue, the second digital item identifying an input roll on which the digital image is going to be printed and a third digital item identifying an output roll on which the printed digital image is going to be wound,
wherein the entry comprises a fourth digital item identifying an input holder for an input roll identified in the second digital item and a fifth digital item identifying an output holder for an output roll identified in the third digital item.

* * * * *